United States Patent
Eyman et al.

(12)
(10) Patent No.: US 10,960,913 B2
(45) Date of Patent: Mar. 30, 2021

(54) FOLDABLE STROLLERS AND RELATED METHODS

(71) Applicant: Kolcraft Enterprises, Inc., Chicago, IL (US)

(72) Inventors: Mark Eyman, Chicago, IL (US); Peter Rolicki, Wheeling, IL (US); Wes Thomas, Racine, WI (US); Sebastiaan Ernst Raak, Enschede (NL); Martijn van Heteren, Hengelo (NL)

(73) Assignee: KOLCRAFT ENTERPRISES, INC., Chicago, IL (US)

( * ) Notice: Subject to any disclaimer, the term of this patent is extended or adjusted under 35 U.S.C. 154(b) by 15 days.

(21) Appl. No.: 16/320,910

(22) PCT Filed: Jul. 27, 2017

(86) PCT No.: PCT/US2017/044192
§ 371 (c)(1),
(2) Date: Jan. 25, 2019

(87) PCT Pub. No.: WO2018/022895
PCT Pub. Date: Feb. 1, 2018

(65) Prior Publication Data
US 2019/0168794 A1    Jun. 6, 2019

Related U.S. Application Data

(60) Provisional application No. 62/367,421, filed on Jul. 27, 2016.

(51) Int. Cl.
*B62B 7/08*    (2006.01)
*B62B 9/00*    (2006.01)
(Continued)

(52) U.S. Cl.
CPC .............. *B62B 7/08* (2013.01); *B62B 7/008* (2013.01); *B62B 7/142* (2013.01); *B62B 9/00* (2013.01);
(Continued)

(58) Field of Classification Search
CPC ........... B62B 7/08; B62B 7/008; B62B 7/142; B62B 9/00; B62B 9/102; B62B 9/104;
(Continued)

(56) References Cited

U.S. PATENT DOCUMENTS 2,907,372 A    10/1959    Leger
3,084,949 A     4/1963    Forster et al.
(Continued)

FOREIGN PATENT DOCUMENTS

BE    1014755    3/2004
CN    2853548    1/2007
(Continued)

OTHER PUBLICATIONS

International Searching Authority, "International Search Report," issued in connection with International Application No. PCT/US2017/044192, dated Oct. 24, 2017, 3 pages.
(Continued)

*Primary Examiner* — Jacob B Meyer
(74) *Attorney, Agent, or Firm* — Hanley, Flight & Zimmerman, LLC

(57) ABSTRACT

Foldable strollers and related methods are disclosed herein. An example frame for use with a stroller includes a first leg having a first wheel coupled thereto, a second leg having a second wheel coupled thereto, a first joint to couple the first leg and the second leg, a handle arm, and a second joint to couple the handle arm and the first leg. The handle arm is to rotate relative to the first leg via the second joint. The rotation of the handle via the second joint is to cause the (Continued)

second leg to rotate relative to the first leg via the first joint to fold the frame.

19 Claims, 14 Drawing Sheets

(51) Int. Cl.
| | |
|---|---|
| *B62B 9/12* | (2006.01) |
| *B62B 9/20* | (2006.01) |
| *B62B 9/28* | (2006.01) |
| *B62B 7/00* | (2006.01) |
| *B62B 7/14* | (2006.01) |
| *B62B 9/10* | (2006.01) |

(52) U.S. Cl.
CPC .............. *B62B 9/102* (2013.01); *B62B 9/104* (2013.01); *B62B 9/12* (2013.01); *B62B 9/20* (2013.01); *B62B 9/28* (2013.01)

(58) Field of Classification Search
CPC .... B62B 9/12; B62B 9/20; B62B 9/28; B62B 2205/22
See application file for complete search history.

(56) References Cited

U.S. PATENT DOCUMENTS

| | | | |
|---|---|---|---|
| 4,142,027 A | 2/1979 | Tsygankov et al. |
| 4,191,397 A | 3/1980 | Kassai |
| 4,354,689 A | 10/1982 | Perego |
| 4,786,064 A | 11/1988 | Baghdasarian |
| 4,834,403 A | 5/1989 | Yanus et al. |
| 4,953,880 A | 9/1990 | Sudakoff et al. |
| 5,197,753 A | 3/1993 | Liu |
| 5,201,535 A | 4/1993 | Kato et al. |
| 5,203,577 A | 4/1993 | Kato et al. |
| 5,215,320 A | 6/1993 | Chen |
| 5,230,523 A | 7/1993 | Wilhelm |
| 5,240,265 A | 8/1993 | Huang |
| 5,265,931 A | 11/1993 | Ryan |
| 5,364,137 A | 11/1994 | Shimer |
| 5,499,831 A | 3/1996 | Worth et al. |
| 5,516,142 A | 5/1996 | Hartan |
| 5,517,718 A | 5/1996 | Eichhorn |
| 5,562,300 A | 10/1996 | Nelson |
| 5,596,910 A | 1/1997 | Bauer et al. |
| 5,601,297 A | 2/1997 | Stein |
| 5,625,923 A | 5/1997 | Huang |
| 5,634,537 A | 6/1997 | Thorn |
| 5,660,430 A | 8/1997 | Clarke |
| 5,676,386 A | 10/1997 | Huang |
| 5,718,439 A | 2/1998 | Wang |
| 5,765,665 A | 6/1998 | Cheng et al. |
| 5,794,951 A | 8/1998 | Corley et al. |
| 5,845,917 A | 12/1998 | Huang |
| 5,845,924 A | 12/1998 | Huang |
| 5,893,606 A | 4/1999 | Chiang |
| 5,935,010 A | 8/1999 | Clarke |
| 5,975,545 A | 11/1999 | Hu |
| 5,988,670 A | 11/1999 | Song et al. |
| 6,022,042 A | 2/2000 | Hartenstine |
| 6,045,145 A | 4/2000 | Lan |
| 6,062,577 A | 5/2000 | Tan |
| 6,070,890 A | 6/2000 | Haut et al. |
| 6,086,086 A | 7/2000 | Hanson et al. |
| 6,086,087 A | 7/2000 | Yang |
| 6,102,167 A | 8/2000 | Chiu |
| 6,102,431 A | 8/2000 | Sutherland et al. |
| 6,120,041 A | 9/2000 | Gehr, Jr. et al. |
| 6,120,054 A | 9/2000 | Hu |
| 6,155,592 A | 12/2000 | Hsia |
| 6,163,924 A | 12/2000 | Ward, Jr. et al. |
| 6,176,459 B1 | 1/2001 | Wilcox et al. |
| 6,176,507 B1 | 1/2001 | Bigo et al. |
| 6,193,263 B1 | 2/2001 | Lin |
| 6,238,125 B1 | 5/2001 | Lin |
| 6,241,274 B1 | 6/2001 | Huang |
| 6,250,652 B1 | 6/2001 | Nelson |
| 6,264,007 B1 | 7/2001 | Norton et al. |
| 6,270,111 B1 | 8/2001 | Hanson et al. |
| 6,286,844 B1 | 9/2001 | Cone, II et al. |
| 6,308,805 B1 | 10/2001 | Lan |
| 6,318,807 B1 | 11/2001 | Perego |
| 6,341,672 B1 | 1/2002 | Yang et al. |
| 6,347,777 B1 | 2/2002 | Webber et al. |
| 6,375,213 B1 | 4/2002 | Suzuki |
| 6,375,260 B1 | 4/2002 | Hiramatsu et al. |
| 6,398,233 B1 | 6/2002 | Liang et al. |
| 6,402,114 B1 | 6/2002 | Carnahan et al. |
| 6,412,809 B1 | 7/2002 | Bigo et al. |
| 6,439,521 B1 | 8/2002 | Wilson et al. |
| 6,443,468 B1 | 9/2002 | Eros |
| 6,446,990 B1 | 9/2002 | Nania et al. |
| 6,478,327 B1 | 11/2002 | Hartenstine et al. |
| 6,478,328 B1 | 11/2002 | Yeh et al. |
| 6,478,376 B2 | 11/2002 | Hayashi et al. |
| 6,499,786 B2 | 12/2002 | Takahashi |
| 6,502,669 B1 | 1/2003 | Harris |
| 6,513,827 B1 | 2/2003 | Barenbrug |
| 6,554,298 B1 | 4/2003 | Bidwell |
| 6,557,870 B2 | 5/2003 | Cheng |
| 6,557,885 B1 | 5/2003 | Kakuda |
| 6,572,134 B2 | 6/2003 | Barrett et al. |
| 6,592,132 B2 | 7/2003 | Bidwell |
| 6,595,583 B2 | 7/2003 | Hou |
| 6,598,712 B1 | 7/2003 | Sun |
| 6,626,452 B2 | 9/2003 | Yang et al. |
| 6,666,473 B2 | 12/2003 | Hartenstine et al. |
| 6,692,015 B2 | 2/2004 | Perego |
| 6,715,783 B1 | 4/2004 | Hanson et al. |
| 6,736,451 B1 | 5/2004 | Chen |
| 6,742,791 B2 | 6/2004 | Lan |
| 6,793,283 B1 | 9/2004 | Sipos |
| 6,793,292 B2 | 9/2004 | Lan |
| 6,830,260 B2 | 12/2004 | Everett |
| 6,851,700 B2 | 2/2005 | Yoshie et al. |
| 6,863,286 B2 | 3/2005 | Eros et al. |
| 6,869,096 B2 | 3/2005 | Allen et al. |
| 6,896,286 B2 | 5/2005 | Lin |
| 6,908,087 B2 | 6/2005 | Wintersgill et al. |
| 6,983,986 B2 | 1/2006 | Jane Santamaria |
| 6,991,248 B2 * | 1/2006 | Valdez .................... B62B 7/062 280/647 |
| 7,017,937 B2 | 3/2006 | Williams |
| 7,032,922 B1 | 4/2006 | Lan |
| 7,044,497 B2 | 5/2006 | Hartenstine et al. |
| 7,059,452 B2 | 6/2006 | Chen |
| 7,070,197 B2 | 7/2006 | Chen |
| 7,083,175 B1 | 8/2006 | Liu |
| 7,118,121 B2 | 10/2006 | Cheng et al. |
| 7,188,858 B2 | 3/2007 | Hartenstine et al. |
| 7,210,699 B2 | 5/2007 | Lan |
| 7,213,818 B2 | 5/2007 | Chang |
| 7,232,019 B2 | 6/2007 | Chang et al. |
| 7,267,359 B1 | 9/2007 | Yang et al. |
| 7,278,652 B2 | 10/2007 | Riedl et al. |
| 7,281,732 B2 * | 10/2007 | Fox .......................... B62B 7/08 280/642 |
| 7,338,122 B2 | 3/2008 | Hei et al. |
| 7,367,581 B2 | 5/2008 | Yang |
| 7,370,913 B2 | 5/2008 | Takamizu et al. |
| 7,377,537 B2 | 5/2008 | Li |
| 7,383,925 B2 | 6/2008 | Chen |
| 7,396,039 B2 * | 7/2008 | Valdez .................... B62B 7/062 280/644 |
| 7,401,803 B1 | 7/2008 | Lai |
| 7,404,569 B2 * | 7/2008 | Hartenstine ............ B62B 7/083 280/47.38 |
| 7,410,186 B2 | 8/2008 | Hartenstine et al. |
| D576,084 S | 9/2008 | Yi |
| 7,445,228 B2 | 11/2008 | Henry |

(56) References Cited

U.S. PATENT DOCUMENTS

| | | | |
|---|---|---|---|
| 7,455,336 B2 | 11/2008 | Bäumchen et al. | |
| 7,475,900 B2 | 1/2009 | Cheng | |
| 7,497,449 B2 | 3/2009 | Logger | |
| 7,497,461 B2 | 3/2009 | Emerson | |
| 7,500,692 B2 | 3/2009 | Espenshade | |
| 7,537,093 B2 | 5/2009 | Chen | |
| 7,550,692 B2 | 6/2009 | Bong | |
| 7,566,068 B2 | 7/2009 | Santamaria | |
| 7,597,396 B2 | 10/2009 | Longenecker et al. | |
| 7,600,775 B2 | 10/2009 | Chen et al. | |
| 7,614,641 B2* | 11/2009 | Hartenstine | B62B 7/083 280/47.38 |
| 7,618,093 B2 | 11/2009 | Hung-Chung | |
| 7,632,035 B2* | 12/2009 | Cheng | B62B 7/062 403/98 |
| 7,658,399 B2 | 2/2010 | Van Dijk | |
| 7,677,590 B2 | 3/2010 | Dotsey et al. | |
| 7,681,894 B2 | 3/2010 | Santamaria | |
| 7,686,322 B2 | 3/2010 | Longenecker et al. | |
| 7,686,323 B2 | 3/2010 | Chen | |
| 7,694,980 B2 | 4/2010 | Dotsey et al. | |
| 7,694,995 B2 | 4/2010 | Dotsey et al. | |
| 7,712,765 B2 | 5/2010 | Chen et al. | |
| 7,753,398 B2* | 7/2010 | Yang | B62B 7/142 280/642 |
| 7,766,366 B2* | 8/2010 | Li | B62B 7/08 280/642 |
| 7,766,367 B2 | 8/2010 | Dotsey et al. | |
| 7,780,183 B2* | 8/2010 | Chen | B62B 7/08 280/47.38 |
| 7,784,801 B2 | 8/2010 | Yeh | |
| 7,798,500 B2 | 9/2010 | Den Boer | |
| 7,798,515 B2 | 9/2010 | Valdez et al. | |
| 7,832,755 B2 | 11/2010 | Nolan et al. | |
| 7,871,099 B2 | 1/2011 | Gilbertson et al. | |
| 7,871,100 B2 | 1/2011 | Chen et al. | |
| 7,900,952 B2 | 3/2011 | Cone, II | |
| 7,909,353 B2 | 3/2011 | Nolan et al. | |
| 7,918,001 B2 | 4/2011 | Buckingham | |
| 7,922,182 B2 | 4/2011 | Van der Vegt | |
| 7,946,650 B2 | 5/2011 | Gillet | |
| 7,971,884 B2 | 7/2011 | Lundh | |
| 7,971,897 B2 | 7/2011 | Pike et al. | |
| 7,971,933 B2 | 7/2011 | Tuckey et al. | |
| D643,344 S | 8/2011 | Barenburg | |
| D643,345 S | 8/2011 | Barenburg | |
| D643,346 S | 8/2011 | Barenburg | |
| D643,786 S | 8/2011 | Barenburg | |
| 8,033,555 B2 | 10/2011 | Mostert et al. | |
| 8,056,975 B2 | 11/2011 | Longenecker et al. | |
| 8,061,732 B2 | 11/2011 | Song et al. | |
| 8,087,680 B2 | 1/2012 | Dotsey et al. | |
| 8,087,688 B2 | 1/2012 | Gilbertson et al. | |
| 8,092,111 B2 | 1/2012 | Wu | |
| 8,100,429 B2 | 1/2012 | Longenecker et al. | |
| 8,157,273 B2 | 4/2012 | Bar-Lev | |
| 8,162,025 B2 | 4/2012 | Motosko et al. | |
| 8,172,243 B2* | 5/2012 | Dresher | A63B 23/12 280/47.38 |
| 8,172,253 B2 | 5/2012 | Song | |
| 8,186,705 B2 | 5/2012 | Greger et al. | |
| 8,205,906 B2 | 6/2012 | Kretschmer et al. | |
| 8,205,907 B2* | 6/2012 | Chicca | B62B 7/08 280/642 |
| 8,220,118 B2 | 7/2012 | Buckingham et al. | |
| 8,226,110 B2* | 7/2012 | Liao | B62B 7/062 280/47.38 |
| 8,226,111 B2 | 7/2012 | Valdez et al. | |
| 8,231,136 B2 | 7/2012 | Fiore, Jr. | |
| 8,240,700 B2 | 8/2012 | Greger et al. | |
| 8,251,382 B2 | 8/2012 | Chen et al. | |
| 8,262,103 B2 | 9/2012 | Enserink et al. | |
| 8,276,935 B2* | 10/2012 | Minato | B62B 7/062 280/647 |
| 8,282,120 B2* | 10/2012 | Minato | B62B 7/08 280/647 |
| 8,291,555 B2 | 10/2012 | Buckingham et al. | |
| 8,313,115 B2 | 11/2012 | Cheng | |
| 8,316,999 B2 | 11/2012 | Solinski et al. | |
| 8,322,744 B2* | 12/2012 | Ahnert | B62B 9/104 280/642 |
| 8,366,127 B2 | 2/2013 | Zhong et al. | |
| 8,371,606 B2 | 2/2013 | Gower et al. | |
| 8,376,375 B2 | 2/2013 | Mival et al. | |
| 8,382,127 B2 | 2/2013 | Longenecker et al. | |
| 8,382,150 B2 | 2/2013 | Williams et al. | |
| 8,388,254 B2 | 3/2013 | Huang | |
| 8,393,679 B2 | 3/2013 | Longenecker et al. | |
| 8,398,096 B2 | 3/2013 | Gower et al. | |
| 8,398,111 B2 | 3/2013 | Mival et al. | |
| 8,398,143 B1 | 3/2013 | Haley | |
| 8,414,012 B2 | 4/2013 | Chen et al. | |
| 8,418,816 B2 | 4/2013 | Chen | |
| 8,444,170 B2* | 5/2013 | Chen | B62B 7/08 280/642 |
| 8,448,977 B2 | 5/2013 | Grintz et al. | |
| D683,974 S | 6/2013 | Leys et al. | |
| 8,458,880 B2 | 6/2013 | Fiore, Jr. | |
| 8,459,665 B2* | 6/2013 | Sellers | B62B 7/08 280/47.38 |
| 8,474,836 B2 | 7/2013 | Yang et al. | |
| 8,474,854 B2* | 7/2013 | Dean | B62B 7/142 280/647 |
| 8,485,546 B2 | 7/2013 | Li et al. | |
| 8,490,757 B2 | 7/2013 | Chen et al. | |
| 8,491,000 B2 | 7/2013 | Yeh et al. | |
| 8,505,956 B2 | 8/2013 | Hartenstine et al. | |
| 8,517,412 B2 | 8/2013 | Tsai et al. | |
| 8,550,489 B2 | 10/2013 | Valdez et al. | |
| 8,556,780 B2 | 10/2013 | Chen | |
| 8,567,311 B2 | 10/2013 | Kraus | |
| 8,567,866 B2 | 10/2013 | Carimati Di Carimate et al. | |
| 8,585,063 B2 | 11/2013 | Chen | |
| 8,585,075 B2 | 11/2013 | Zhong | |
| 8,590,919 B2 | 11/2013 | Yi | |
| 8,596,669 B2 | 12/2013 | Liao | |
| 8,596,670 B2 | 12/2013 | di Carimate et al. | |
| 8,602,442 B2* | 12/2013 | Li | B62B 7/08 280/647 |
| 8,608,190 B2 | 12/2013 | Mountz | |
| 8,616,638 B2 | 12/2013 | Zeng et al. | |
| 8,635,743 B2* | 1/2014 | Smith | B62B 7/08 16/382 |
| D699,633 S | 2/2014 | Kobayashi et al. | |
| 8,646,158 B2 | 2/2014 | Buckingham et al. | |
| 8,651,502 B2 | 2/2014 | Winterhalter et al. | |
| 8,657,308 B2 | 2/2014 | Gower et al. | |
| 8,657,311 B2 | 2/2014 | Li | |
| 8,662,516 B1 | 3/2014 | Slagerman | |
| 8,672,341 B2 | 3/2014 | Offord | |
| 8,678,498 B2 | 3/2014 | Heisey | |
| 8,696,015 B2 | 4/2014 | Karremans et al. | |
| 8,702,118 B2 | 4/2014 | Gower et al. | |
| 8,708,364 B2 | 4/2014 | Gower et al. | |
| 8,713,765 B2 | 5/2014 | Buckingham et al. | |
| 8,714,581 B2 | 5/2014 | Fritz et al. | |
| 8,720,936 B1 | 5/2014 | Lai | |
| 8,764,048 B1 | 7/2014 | Ahnert et al. | |
| 8,777,253 B2 | 7/2014 | Minato et al. | |
| 8,789,662 B2 | 7/2014 | Childs et al. | |
| 8,827,283 B2 | 9/2014 | Homan et al. | |
| 8,840,132 B2 | 9/2014 | Gower et al. | |
| 8,844,964 B2 | 9/2014 | Chiang | |
| 8,851,505 B2 | 10/2014 | Van Gelderen et al. | |
| 8,864,166 B2 | 10/2014 | Longenecker et al. | |
| D716,705 S | 11/2014 | Holefleisch | |
| 8,876,147 B2* | 11/2014 | Chicca | B62B 7/062 280/642 |
| 8,882,134 B2* | 11/2014 | Rolicki | B62B 9/20 280/647 |
| 8,899,614 B2 | 12/2014 | Smith | |
| 8,899,615 B2 | 12/2014 | Dijkstra | |

(56) References Cited

U.S. PATENT DOCUMENTS

| | | | |
|---|---|---|---|
| 8,905,427 B2 | 12/2014 | Katz et al. | |
| 8,905,428 B2* | 12/2014 | Schroeder | B62B 7/08 |
| | | | 280/650 |
| 8,919,806 B2 | 12/2014 | Pollack et al. | |
| 8,919,807 B2 | 12/2014 | Taylor et al. | |
| 8,936,261 B2* | 1/2015 | Yuan | B62B 7/008 |
| | | | 280/47.38 |
| 8,955,856 B2 | 2/2015 | Guo | |
| 8,955,868 B2* | 2/2015 | Haut | B62B 7/06 |
| | | | 280/639 |
| 8,955,869 B2 | 2/2015 | Zehfuss | |
| 8,960,734 B2 | 2/2015 | Camp | |
| 8,961,057 B2* | 2/2015 | Schroeder | B62B 7/08 |
| | | | 403/102 |
| 8,973,217 B2 | 3/2015 | Weichbrodt | |
| 8,985,616 B1 | 3/2015 | Chen | |
| 8,991,838 B2 | 3/2015 | Li et al. | |
| 8,991,853 B2 | 3/2015 | Li et al. | |
| 8,991,854 B2 | 3/2015 | Greger et al. | |
| 8,997,948 B2 | 4/2015 | Li et al. | |
| 9,010,773 B2 | 4/2015 | Horst et al. | |
| 9,044,104 B2 | 6/2015 | Smith | |
| 9,050,993 B2 | 6/2015 | Pollack | |
| 9,067,613 B2 | 6/2015 | Yi et al. | |
| 9,085,312 B2 | 7/2015 | Liu | |
| 9,090,125 B2 | 7/2015 | Block et al. | |
| 9,108,658 B2 | 8/2015 | Spencer et al. | |
| 9,108,659 B2 | 8/2015 | Sparling | |
| 9,139,044 B1 | 9/2015 | Tsai | |
| 9,150,236 B2 | 10/2015 | Zhang | |
| 9,174,662 B2 | 11/2015 | Zhang | |
| 9,193,370 B2 | 11/2015 | Henry | |
| 9,193,373 B2 | 11/2015 | Fjelland et al. | |
| 9,205,855 B2 | 12/2015 | Gower et al. | |
| 9,216,755 B2 | 12/2015 | Eisinger | |
| 9,260,127 B2* | 2/2016 | Rolicki | B62B 9/20 |
| 9,260,128 B2 | 2/2016 | Liu | |
| D756,852 S | 5/2016 | Barenburg | |
| 9,327,752 B2 | 5/2016 | Jane Santamaria | |
| 9,399,477 B2* | 7/2016 | Iftinca | B62B 7/06 |
| 9,403,449 B2 | 8/2016 | Longenecker et al. | |
| 9,403,549 B2 | 8/2016 | Driessen | |
| 9,403,550 B2 | 8/2016 | Zehfuss | |
| 9,415,790 B2 | 8/2016 | Driessen | |
| 9,428,208 B1 | 8/2016 | Chen | |
| 9,463,822 B2* | 10/2016 | Sundberg | B62B 7/10 |
| 9,481,206 B2 | 11/2016 | Block et al. | |
| 9,493,178 B2 | 11/2016 | Smith et al. | |
| 9,517,786 B2 | 12/2016 | Chang et al. | |
| 9,517,789 B2 | 12/2016 | Pacella et al. | |
| 9,522,615 B2 | 12/2016 | Longenecker et al. | |
| 9,540,028 B2 | 1/2017 | Taylor et al. | |
| 9,545,940 B2 | 1/2017 | Taylor et al. | |
| 9,545,941 B2 | 1/2017 | Pacella et al. | |
| 9,561,816 B2* | 2/2017 | Dowd | B62B 7/062 |
| 9,610,966 B2 | 4/2017 | Zhong | |
| 9,630,642 B2 | 4/2017 | Zehfuss et al. | |
| 9,637,153 B2 | 5/2017 | Sclare | |
| 9,643,640 B2 | 5/2017 | Gower et al. | |
| 9,701,332 B2* | 7/2017 | Zheng | B62B 9/203 |
| 9,725,107 B2* | 8/2017 | Li | B62B 7/068 |
| 9,776,652 B2 | 10/2017 | Zhong | |
| 9,796,404 B2* | 10/2017 | Xu | B62B 7/08 |
| 9,815,487 B2 | 11/2017 | Dowd et al. | |
| 9,821,831 B2 | 11/2017 | Reaves et al. | |
| 9,840,168 B2 | 12/2017 | Yi et al. | |
| 9,849,903 B1 | 12/2017 | Lai | |
| 9,862,401 B2* | 1/2018 | Wuerstl | B62B 7/08 |
| 9,884,640 B2* | 2/2018 | Li | B62B 7/142 |
| 9,902,417 B2 | 2/2018 | Storm et al. | |
| 9,908,551 B2* | 3/2018 | Ransil | B62B 7/08 |
| 9,944,305 B2 | 4/2018 | Lee et al. | |
| 9,950,730 B2 | 4/2018 | Gao | |
| 9,962,011 B1 | 5/2018 | Eyman | |
| 10,000,226 B2 | 6/2018 | Yi | |
| 10,023,218 B2 | 7/2018 | Paxton et al. | |
| 10,077,063 B2 | 9/2018 | Haut et al. | |
| 10,144,442 B2* | 12/2018 | Ransil | B62B 7/08 |
| 10,150,496 B2 | 12/2018 | Oakes | |
| 10,155,528 B2 | 12/2018 | Zhong et al. | |
| 10,239,550 B2 | 3/2019 | Ruggiero et al. | |
| 10,414,423 B2 | 9/2019 | Zhong | |
| 10,442,453 B2 | 10/2019 | Haut et al. | |
| 10,449,987 B2 | 10/2019 | Gibson | |
| 10,556,610 B2* | 2/2020 | Rolicki | B62B 7/04 |
| 2002/0041082 A1* | 4/2002 | Perego | B62B 7/08 |
| | | | 280/647 |
| 2003/0094791 A1 | 5/2003 | Hartenstine et al. | |
| 2004/0090046 A1 | 5/2004 | Hartenstine et al. | |
| 2005/0150053 A1 | 7/2005 | Hartenstine | |
| 2005/0167951 A1 | 8/2005 | Zhen | |
| 2005/0225056 A1* | 10/2005 | Dotsey | B62B 9/20 |
| | | | 280/642 |
| 2005/0242548 A1 | 11/2005 | Hutchinson et al. | |
| 2005/0264064 A1 | 12/2005 | Hei et al. | |
| 2007/0013167 A1 | 1/2007 | Henry | |
| 2007/0031224 A1 | 2/2007 | Lutz | |
| 2007/0045975 A1 | 3/2007 | Yang | |
| 2007/0085303 A1 | 4/2007 | Cheng | |
| 2007/0108710 A1 | 5/2007 | Pennisi et al. | |
| 2007/0126195 A1* | 6/2007 | Dresher | A63B 21/0053 |
| | | | 280/47.38 |
| 2007/0187914 A1 | 8/2007 | Jane Santamaria | |
| 2007/0241524 A1 | 10/2007 | Dotsey et al. | |
| 2008/0079240 A1 | 4/2008 | Yeh | |
| 2008/0093825 A1 | 4/2008 | Yang | |
| 2008/0211206 A1* | 9/2008 | Thorne | B62B 7/083 |
| | | | 280/650 |
| 2008/0224450 A1 | 9/2008 | Van der Vegt | |
| 2008/0231023 A1 | 9/2008 | Yang | |
| 2009/0194973 A1 | 8/2009 | Wang | |
| 2009/0206566 A1 | 8/2009 | Enserink et al. | |
| 2009/0295128 A1 | 12/2009 | Nagelski et al. | |
| 2009/0315299 A1 | 12/2009 | Barenbrug | |
| 2010/0038887 A1 | 2/2010 | Bar-Lev | |
| 2010/0052277 A1 | 3/2010 | Zehfuss | |
| 2010/0109293 A1* | 5/2010 | Friisdahl | B62B 7/12 |
| | | | 280/643 |
| 2010/0127480 A1* | 5/2010 | Ahnert | B62B 7/142 |
| | | | 280/647 |
| 2010/0140902 A1* | 6/2010 | Zehfuss | B62B 7/14 |
| | | | 280/650 |
| 2010/0230933 A1 | 9/2010 | Dean et al. | |
| 2010/0237637 A1 | 9/2010 | Camp | |
| 2011/0012324 A1 | 1/2011 | Yeh et al. | |
| 2011/0062676 A1 | 3/2011 | Gower et al. | |
| 2011/0148076 A1* | 6/2011 | Chen | B62B 9/203 |
| | | | 280/650 |
| 2011/0163519 A1 | 7/2011 | Van Gelderen et al. | |
| 2011/0181024 A1* | 7/2011 | Chicca | B62B 7/08 |
| | | | 280/642 |
| 2011/0193325 A1 | 8/2011 | Li | |
| 2011/0221169 A1 | 9/2011 | Karremans et al. | |
| 2011/0266762 A1 | 11/2011 | Chen | |
| 2011/0272925 A1 | 11/2011 | Dijkstra | |
| 2011/0291388 A1* | 12/2011 | Sellers | B62B 7/142 |
| | | | 280/647 |
| 2011/0291389 A1* | 12/2011 | Offord | B62B 7/008 |
| | | | 280/650 |
| 2011/0309658 A1 | 12/2011 | Carimati Di Carimate et al. | |
| 2012/0242062 A1* | 9/2012 | Schroeder | B62B 7/08 |
| | | | 280/650 |
| 2013/0113185 A1 | 5/2013 | Zehfuss | |
| 2013/0153616 A1 | 6/2013 | Geva et al. | |
| 2013/0154215 A1* | 6/2013 | Thomas | B62B 9/18 |
| | | | 280/47.38 |
| 2013/0154322 A1 | 6/2013 | Gower et al. | |
| 2013/0227817 A1 | 9/2013 | Block et al. | |
| 2013/0270800 A1 | 10/2013 | Chiang | |
| 2014/0044472 A1 | 2/2014 | Lin et al. | |
| 2014/0054939 A1 | 2/2014 | Hu | |

(56) References Cited

U.S. PATENT DOCUMENTS

| | | | |
|---|---|---|---|
| 2014/0056638 A1 | 2/2014 | Wu et al. | |
| 2014/0167393 A1 | 6/2014 | Tsai et al. | |
| 2014/0183843 A1* | 7/2014 | Iftinca | B62B 9/104 280/647 |
| 2014/0191483 A1* | 7/2014 | Rolicki | B62B 7/04 280/47.41 |
| 2015/0021872 A1* | 1/2015 | Rolicki | B62B 7/008 280/47.41 |
| 2015/0042075 A1 | 2/2015 | Smith et al. | |
| 2015/0074947 A1 | 3/2015 | Rezaei | |
| 2015/0076774 A1 | 3/2015 | Sclare | |
| 2015/0108738 A1 | 4/2015 | Pollack et al. | |
| 2015/0136553 A1 | 5/2015 | Den Boer et al. | |
| 2015/0152665 A1 | 6/2015 | Camp | |
| 2015/0158334 A1 | 6/2015 | Hartenstine et al. | |
| 2015/0197268 A1 | 7/2015 | Dowd et al. | |
| 2015/0274188 A1* | 10/2015 | Li | B62B 7/062 280/650 |
| 2015/0291200 A1 | 10/2015 | Taylor et al. | |
| 2015/0375766 A1 | 12/2015 | Taylor et al. | |
| 2016/0001804 A1 | 1/2016 | Pacella et al. | |
| 2016/0046314 A1 | 2/2016 | Zehfuss et al. | |
| 2016/0159385 A1* | 6/2016 | Rolicki | B62B 7/08 29/428 |
| 2016/0288814 A1* | 10/2016 | Li | B62B 7/064 |
| 2016/0332655 A1 | 11/2016 | Reaves et al. | |
| 2017/0021851 A1 | 1/2017 | Pujol | |
| 2017/0144686 A1 | 5/2017 | Pujol et al. | |
| 2017/0203779 A1 | 7/2017 | Gower et al. | |
| 2017/0217471 A1 | 8/2017 | Haut et al. | |
| 2019/0168794 A1* | 6/2019 | Eyman | B62B 9/00 |
| 2019/0193769 A1* | 6/2019 | Xu | B62B 7/08 |
| 2019/0256121 A1 | 8/2019 | Rolicki et al. | |
| 2019/0256122 A1* | 8/2019 | Eyman | B62B 9/20 |

FOREIGN PATENT DOCUMENTS

| | | | |
|---|---|---|---|
| CN | 201161604 | 12/2008 | |
| CN | 201530404 | 7/2010 | |
| CN | 101837799 | 9/2010 | |
| CN | 201792891 | 4/2011 | |
| CN | 104354750 | 2/2015 | |
| CN | 205022654 | 2/2016 | |
| CN | 205186242 | 4/2016 | |
| CN | 205345000 | 6/2016 | |
| DE | 3130163 | 2/1983 | |
| DE | 10011588 | 1/2001 | |
| DE | 202007011019 | 12/2007 | |
| DE | 202010011566 | 11/2010 | |
| EP | 791500 | 8/1997 | |
| EP | 1918155 | 5/2008 | |
| EP | 1992543 | 11/2008 | |
| EP | 2192022 A2 * | 6/2010 | B62B 7/142 |
| EP | 2420429 * | 11/2010 | |
| EP | 2275321 | 1/2011 | |
| EP | 2368784 | 9/2011 | |
| EP | 2892790 | 7/2015 | |
| EP | 2927090 | 10/2015 | |
| FR | 2648102 | 12/1990 | |
| GB | 2171299 | 8/1986 | |
| GB | 2193692 | 2/1988 | |
| GB | 2431140 | 4/2007 | |
| JP | 2008030741 | 2/2008 | |
| WO | 2008033014 | 3/2008 | |
| WO | 2010047596 | 4/2010 | |
| WO | 2014037177 | 3/2014 | |
| WO | 2015109103 | 7/2015 | |
| WO | 2018022889 | 2/2018 | |
| WO | 2018022893 | 2/2018 | |
| WO | 2018022895 | 2/2018 | |
| WO | 2019019097 | 1/2019 | |

OTHER PUBLICATIONS

International Searching Authority, "Written Opinion of the International Searching Authority," issued in connection with International Application No. PCT/US2017/044192, dated Oct. 24, 2017, 11 pages.
International Searching Authority, "International Search Report," issued in connection with International Patent Application No. PCT/US2017/044190, dated Sep. 27, 2017, 3 pages.
International Searching Authority, "Written Opinion of the International Searching Authority," issued in connection with International Patent Application No. PCT/US2017/044190, dated Sep. 27, 2017, 7 pages.
International Searching Authority, "International Search Report," issued in connection with International Patent Application No. PCT/US2017/044183, dated Oct. 24, 2017, 3 pages.
International Searching Authority, "Written Opinion of the International Searching Authority," issued in connection with International Patent Application No. PCT/US2017/044183, dated Oct. 24, 2017, 9 pages.
International Searching Authority, "International Search Report and Written Opinion," issued in connection with International Patent Application No. PCT/CN2017/094679, dated Mar. 27, 2018, 8 pages.
The International Bureau of WIPO, "International Preliminary Report on Patentability," dated Jan. 29, 2019 in connection with International Application No. PCT/US2017/044190, 8 pages.
The International Bureau of WIPO, "International Preliminary Report on Patentability," dated Jan. 29, 2019 in connection with International Patent Application No. PCT/US2017/044192, 12 pages.
United States Patent and Trademark Office, "Notice of Allowance," issued in connection with U.S. Appl. No. 16/322,350, dated Dec. 12, 2019, 8 pages.
The International Bureau of WIPO, "International Preliminary Report on Patentability," issued in connection with International Patent Application No. PCT/CN2017/094679, dated Jan. 28, 2020, 5 pages.
European Patent Office, "Extended European Search Report," issued in connection with European Patent Application No. 17835273.8, dated Mar. 13, 2020, 9 pages.
The International Bureau, "International Preliminary Report on Patentability," issued in connection with International Patent Application No. PCT/US2017/044183, dated Jan. 29, 2019, 10 pages.
European Patent Office, "Extended European Search Report," issued in connection with European Patent Application No. 17835275.3, dated Mar. 13, 2020, 8 pages.
United States Patent and Trademark Office, "Notice of Allowance," issued in connection with U.S. Appl. No. 16/322,350, dated Apr. 20, 2020, 8 pages.
European Patent Office, "Extended European Search Report," issued in connection with European Patent Application No. 17919214.1. dated Jun. 2, 2020, 8 pages.
United States Patent and Trademark Office, "Notice of Allowance," issued in connection with U.S. Appl. No. 16/322,350, dated Aug. 25, 2020, 8 pages.
United States Patent and Trademark Office, "Non-Final Office Action," issued in connection with U.S. Appl. No. 16/320,914, dated Aug. 21, 2020, 5 pages.
United States Patent and Trademark Office, "Non-Final Office Action," issued in connection with U.S. Appl. No. 16/320,913, dated Sep. 4, 2020, 5 pages.
China National Intellectual Property Administration, "Office Action," issued in connection with Chinese Patent Application No. 201780056227, dated Nov. 4, 2020, 19 pages (includes English translation).
China National Intellectual Property Administration, "Office Action," issued in connection with Chinese Patent Application No. 201780056364, dated Nov. 17, 2020, 8 pages.
United States Patent and Trademark Office, "Notice of Allowance," issued in connection with U.S. Appl. No. 16/320,913, dated Dec. 30, 2020, 5 pages.
United States Patent and Trademark Office, "Notice of Allowance," issued in connection with U.S. Appl. No. 16/322,350, dated Feb. 11, 2021, 8 pages.

(56) References Cited

OTHER PUBLICATIONS

Chinese Patent Office, "Office Action," issued in connection with Chinese Patent Application No. 201780056235.4, dated Dec. 30, 2020, 23 pages (includes English translation).

* cited by examiner

FOLDABLE STROLLERS AND RELATED METHODS

RELATED APPLICATION

This patent claims priority to U.S. Provisional Patent Application Ser. No. 62/367,421, titled "Foldable Stroller with Removable Seats and Related Methods," which was filed on Jul. 27, 2016, and is hereby incorporated by reference in its entirety.

FIELD OF THE DISCLOSURE

This disclosure relates generally to strollers and, more particularly, to foldable strollers and related methods.

BACKGROUND

Known strollers include a frame to support one or more seats and/or accessories (e.g., a basket). The frames of some known strollers folds to, for example, reduce a footprint of the strollers when the strollers are not in use.

BRIEF DESCRIPTION OF THE DRAWINGS

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 1:
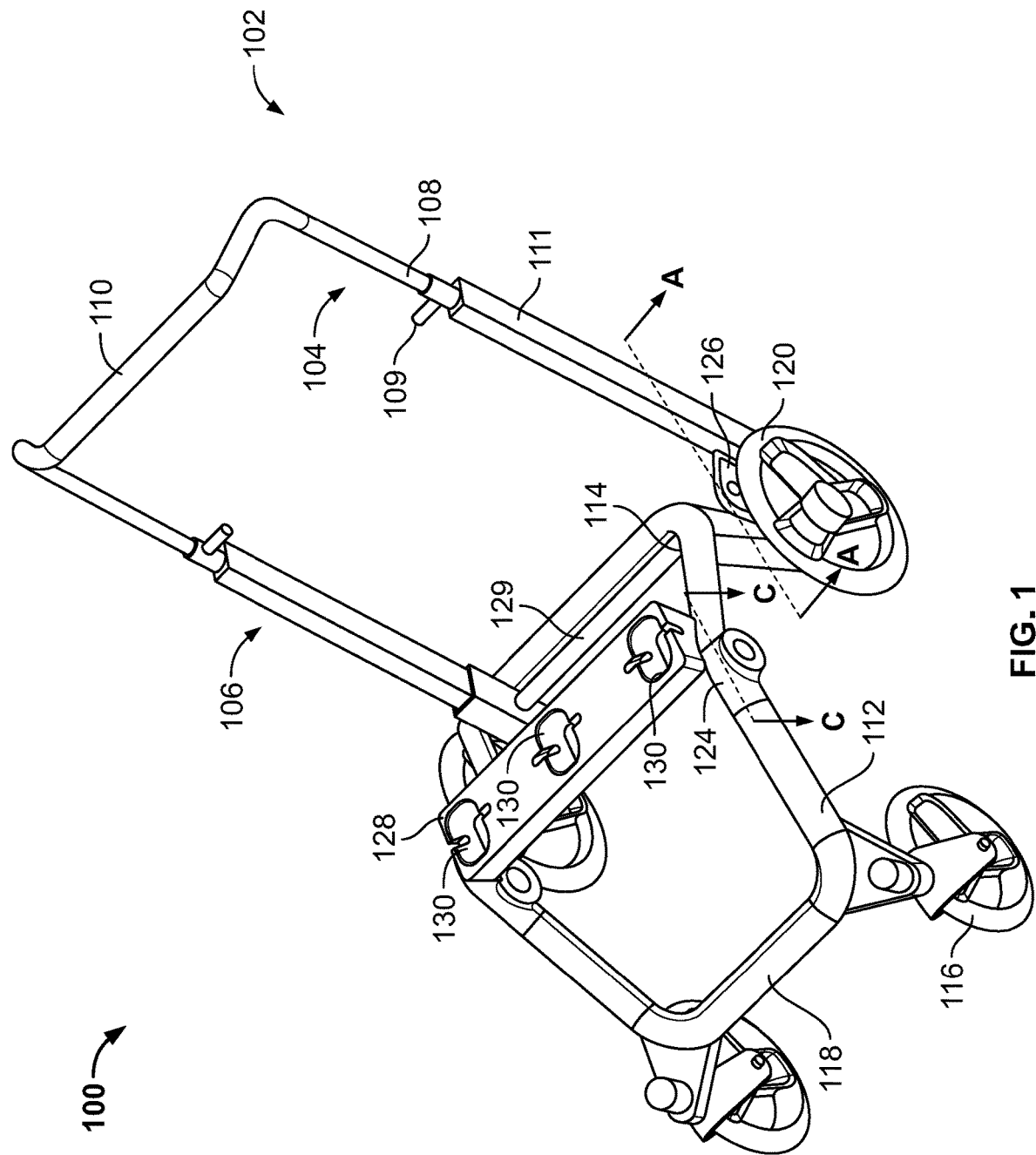
FIG. 1 is a right, front perspective view of an example stroller having a foldable frame in accordance with the teachings of this disclosure, the frame in an extended position.

Strollers typically include a frame and a seat supported by the frame to receive a child occupant. The frame of a stroller typically includes legs, wheels coupled to the legs, and a handle that enables a user (e.g., a caregiver) to push the stroller. In some examples, an accessory, such as a basket, is also supported by the frame.

When the stroller is not being used to carry a child, the user may wish to fold the frame of the stroller for storage purposes, to reduce a size of the stroller in crowded areas such as a restaurant, to fit the stroller in a vehicle such as a car to transport the stroller, etc. Often times the user is caring for the child while folding the stroller frame. Thus, the user typically wishes to quickly fold the stroller frame without needing to perform multiple and/or physically demanding steps to fold the stroller frame.

Disclosed herein are example strollers including a foldable frame that moves from an expanded or use position to a collapsed or stored position when not in use. In disclosed examples, a handle of the frame can be activated by a user to cause a remainder of the frame to fold or collapse, thereby providing for efficient folding of the frame. In some examples disclosed herein, the frame is folded after seat(s) and/or accessories have been uncoupled from the stroller frame. Thus, example stroller disclosed herein provide for compact storage of the stroller frame.

Some example stroller frames disclosed herein include a handle coupled to a handle hub disposed proximate to a rear leg of the stroller (e.g., a leg that supports a rear wheel of the stroller). The handle hub is operatively coupled to a joint disposed between the rear leg of the stroller and a front leg of the stroller (e.g., a leg that supports a front wheel of the stroller). In some disclosed examples, the handle hub is operatively coupled to the joint via cable. In some disclosed examples, when the user pushes on the handle, the handle folds at the handle hub relative to the rear leg. During folding of the handle, the handle hub pulls on the cable, which enables or causes the stroller frame to fold at the joint coupling the front leg and the rear leg. Thus, example strollers disclosed herein provide for substantial folding of the stroller frame via the stroller handle. Further, example strollers disclosed herein provide for efficient and convenient folding and storage of the stroller frame.

An example frame for use with a stroller is disclosed herein. The example frame includes a first leg, a second leg, a first joint to couple the first leg and the second leg, a handle arm, and a second joint to couple the handle arm and the first leg. The handle arm is to rotate relative to the first leg via the second joint. The rotation of the handle via the second joint enables the second leg to rotate relative to the first leg via the first joint to fold the frame.

In some examples, the frame further includes a lock disposed in the first joint. The rotation of the handle is to release the lock to cause the second leg to rotate.

In some examples, the second joint is operatively coupled to the first joint via a cable. The cable is to extend from the second joint to the first joint via the first leg.

In some examples, the frame further includes a pin disposed in the first joint. The cable is coupled to the pin. The rotation of the handle arm is to cause the cable to pull the pin to enable the second leg to rotate.

In some examples, the second joint includes a first portion and a second portion, the first portion removably coupled to the second portion.

In some examples, the first portion is to disengage from the second portion via the handle arm to enable the handle arm to rotate relative to the first leg. In some such examples, the first portion includes a plate defining an opening and the second portion includes a pin to be received in the opening, and the frame further includes a lever disposed in the first portion. The handle arm is to cause to lever to release the pin from the opening. In some such examples, the lever is to cause the opening to slide relative to the pin when a portion of the handle arm engages the lever.

Another example frame for use with a stroller is disclosed herein. The example frame includes a first frame member having a first wheel coupled thereto, a second frame member having a second wheel coupled thereto, a third frame member, a first joint to couple the first frame member and the second frame member, the first joint including a lock, and a second joint to couple the second frame member and the third frame member, the second joint operatively coupled to the first joint. The third frame member is to rotate via the second joint to release the lock to enable the first frame member to move from an extended position to a collapsed position to fold the frame.

In some examples, the frame further includes a cable extending from the second joint to the lock. The cable is to displace the lock during rotation of the third frame member. In some such examples, the frame further includes a plate disposed in the second joint. The cable is to be at least partially wound about the plate. The third frame member is to pivot about the plate.

In some examples, the first joint includes a stop. The lock is to engage the stop when the first frame member is in the first position.

In some examples, the lock is a first lock and the second joint includes a second lock. The third frame member is to slide relative to the second joint to release the second lock to enable the third frame member to rotate.

In some examples, the first joint includes a detent arm and a housing. A protrusion of the housing is to engage the detent arm when the first frame member moves to the collapsed position.

An example stroller disclosed herein includes a frame including a front leg, a rear leg, a handle, a first joint to couple the front leg and the rear leg and a second joint to couple the handle and the rear leg. The example stroller includes a mount bar coupled to the frame proximate to the first joint. The handle is to rotate relative to the rear leg via the second joint. The rotation of the handle is to enable the front leg to rotate relative to the rear leg via the first joint. The handle is to be disposed proximate to the mount bar when the frame is in a folded position.

In some examples, the mount bar includes a pin. The handle is to engage the pin when the frame is in the folded position.

In some examples, the stroller further includes a rear wheel coupled to the rear leg. When in the frame is in folded position, the rear wheel and a portion of the second joint are to engage a surface on which the frame rests. In some such examples, the stroller further includes a front wheel coupled to the front leg. The front wheel is to pivot relative to the rear wheel when the frame is in the folded position.

In some examples, the handle includes an arm and the second joint includes a first portion and second portion. The first portion is removably coupled to the second portion. The arm is to slide relative to the second joint to release the first portion from the second portion.

In some examples, the stroller further includes a tube coupled to the second joint. The tube is to extend between a first side of the frame and a second side of the frame. The handle is to pivot about the tube.

Turning to the figures, FIG. 1 is a right, front perspective view of example stroller 100 constructed in accordance with the teachings of this disclosure. For illustrative purposes, the example stroller 100 is shown without seat(s) and/or accessories coupled thereto. The example stroller 100 includes a frame 102 having a first side 104 and a second side 106. The first side 104 and the second side 106 of the stroller frame 102 include a plurality of frame members and wheels attached to the frame members. The frame members and wheels of the first side 104 of the stroller frame 102 will be described herein with the understanding that the second side 106 is a mirror image of the first side 104. Thus, the second side 106 includes substantially identical frame members and wheels as the first side 104 and, in the interest of brevity, will not be repeatedly detailed herein.

In the illustrated example stroller 100, the first side 104 includes an arm 108 extending from a parent handle 110. The parent handle 110 is disposed between the first side 104 and the second side 106 of the stroller frame 102. In some examples, the arm 108 and the parent handle 110 are integrally formed from a unit such as, for example, a tube.

In the example of FIG. 1, a height of the parent handle 110 is adjustable via adjustment of a height of the arm 108. In some examples, the arm 108 is at least partially disposed in a housing 111 such that the arm 108 slides relative to the housing 111 to adjust the height of the handle 110. The example arm 108 of FIG. 1 includes a handle lock 109. The handle lock 109 can include a lever having a tab that engages one of a plurality of notches formed in the arm 108 to lock the handle 110 at a desired height relative to a surface on which the stroller frame 102 rests. As disclosed herein, in some examples, the lock 109 is released by the user to allow the user to push down on the handle 110 (e.g., toward the ground surface) as part of folding the frame 102 of the stroller 100.

The first side 104 of the stroller frame 102 also includes a front leg 112 and a rear leg 114. A front wheel 116 is rotatably coupled to the front leg 112. In some examples, the front wheel 116 is rotatably coupled to a front bar 118 that extends between the first side 104 and the second side 106. A rear wheel 120 is rotatably coupled to the rear leg 114. In some examples, a rear wheel 120 is coupled to a rear axle that extends between the first side 104 and the second side 106. Although the example stroller 100 of FIG. 1 includes four wheels (e.g., two front wheels 116 and two rear wheels 120 coupled to the first and second sides 104, 106 of the stroller frame 102), different numbers of front and/or rear wheels are used in other examples (e.g., a single front wheel).

In the illustrated example, the front leg 112 and the rear leg 114 are coupled via a seat hub or a joint 124. The rear leg 114 and the arm 108 are coupled via a handle hub 126 (e.g., a joint). As disclosed herein, the joint 124 and the handle hub 126 facilitate folding of the stroller frame 102 such that front leg 112 and the arm 108 and, thus, the parent handle 110 are free to rotate relative to the rear leg 114.

In the example of FIG. 1, a tube 129 extends between the example handle hub 126 of the first side 104 and the example handle hub 126 of the second side. In some examples, the tube 129 is rotatably coupled to the handle hub(s) 126. As disclosed herein, the rotating tube 129 facilitates folding of the respective arm(s) 108 of the first and second sides 104, 106 via the example handle hub(s) 126. In particular, in the example of FIG. 1, the arm(s) 108 pivot about the tube 129 via the example handle hub 126.

The example stroller 100 of FIG. 1 includes a mount bar 128. The example mount bar 128 includes a plurality of receivers 130. In the example of FIG. 1, one or more seats and/or accessories can be removably coupled to the stroller frame 102 by inserting the seat and/or accessory in one of the receivers 130 of the mount bar 128. The seat(s) and/or accessories can be locked to a respective receiver 130 via lock(s) provided on the seat or the accessory that are received in opening(s) defined in each receiver 130. The seat(s) and/or accessories can be selectively removed from the receiver(s) 130 via user control of the lock(s) on the seat(s) or the accessories.

Figure 2:
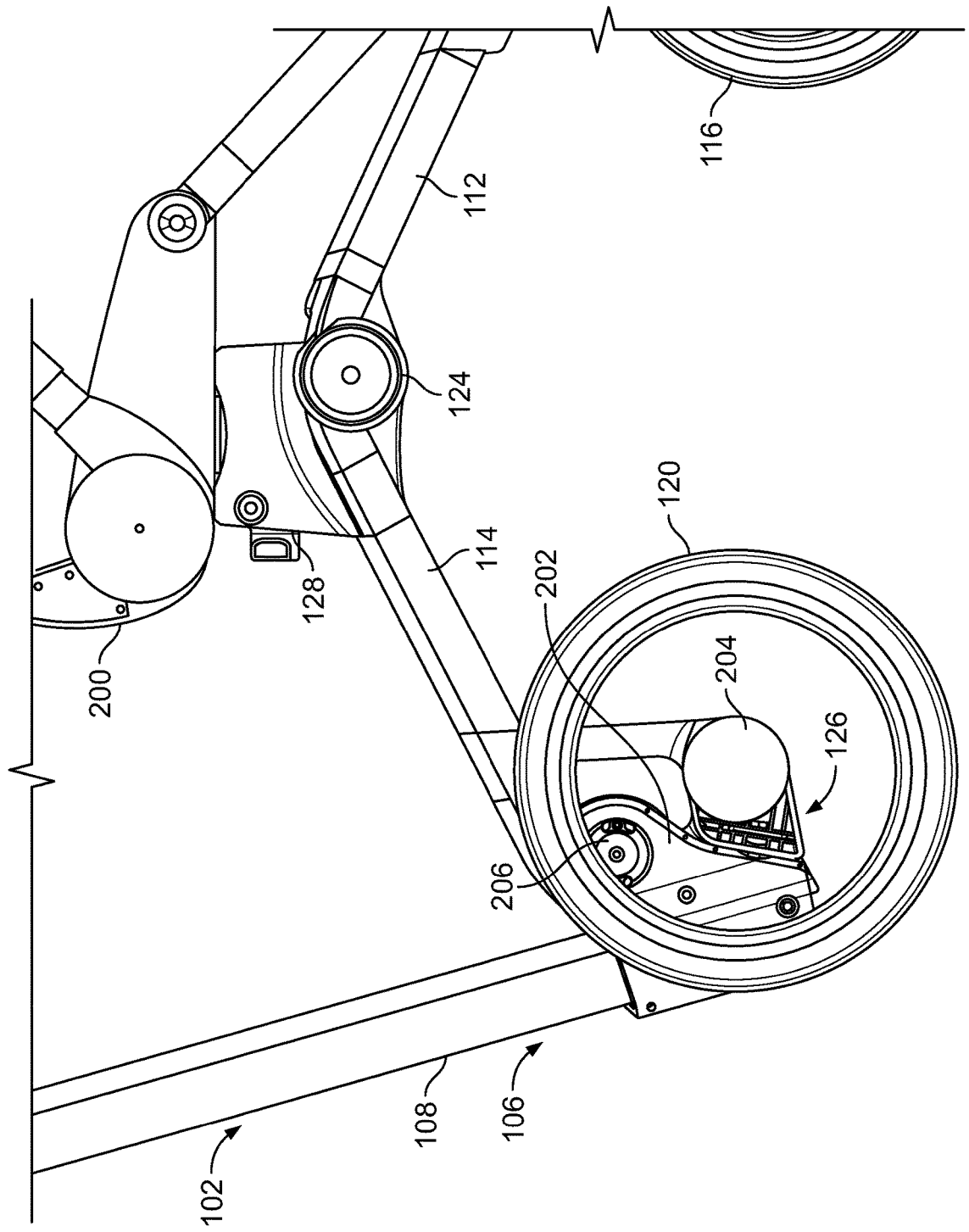
FIG. 2 is a partial left side view of the example stroller of FIG. 1 including a seat coupled to the frame of the stroller.

FIG. 2 is a partial side view of the example stroller 100 of FIG. 1. In particular, FIG. 2 illustrates the second side 106 of the stroller 100. FIG. 2 shows an example seat 200 coupled to one of the receivers of the mount bar 128. In the example of FIG. 2, the mount bar 128 is supported by the frame 102 proximate to the joint 124 coupling the front leg 112 and the rear leg 114. In some examples, at least a portion of the mount bar 128 is coupled to or supported by the joint 124 of the stroller frame 102.

As illustrated in FIG. 2, the example handle hub 126 (e.g., a joint) is coupled to the rear leg 114 and the arm 108. The example handle hub 126 includes a release portion 202 and a locking portion 204. The release portion 202 is removably coupled to the locking portion 204 when the stroller frame 102 is in the extended or use position. As disclosed herein, the release portion 202 releases from the locking portion 204 during folding of the stroller frame to facilitate folding of the arm 108.

The example release portion 202 includes means for directing the rotation of the arm 108 via the example handle hub 126. For example, the release portion 202 of FIG. 2 includes a pivot plate 206. The example pivot plate 206 is coupled to the tube 129 (FIG. 1) that extends between the example handle hub 126 of the second side 106 of the stroller 100 and the example handle hub 126 of the first side 104 of the stroller 100. During folding of the frame 102, the example pivot plate 206 transfers rotational motion from the arm 108 to the tube 129 such that the arm 108 and the release portion 202 of the example handle hub 126 pivot about the tube 129.

To fold the example stroller frame 102 of FIGS. 1 and 2, the user removes the seat 200 or the accessory from the mount bar 128. The user pushes down on the handle 110 of FIG. 1 such that the arm(s) 108 move (e.g., slide) toward the surface on which the stroller frame 102 rests. In the examples of FIGS. 1 and 2, the movement of the arm(s) 108 causes the release portion 202 of the respective handle hub(s) 126 to uncouple from the locking portion 204 of the handle hub(s) 126. The unlocking of the release portion 202 from the locking portion 204 enables the arm(s) 108 to be rotated about the pivot plate 206 of the respective handle hub(s) 126 and toward the rear leg 114. To continue to fold the stroller frame 102, the user tips or pivots the frame 102 on the rear wheel(s) 120 (e.g., as if to lift to the front wheel(s) 116 off of the floor or ground). As disclosed herein, the folding of the arm 108 via the example handle hub 126 causes a pin in the joint 124 that holds the front leg 112 in an extended position during use of the stroller 100 to release via a cable connection between the handle hub 126 and the joint 124, thereby allowing the front leg 112 to fold at the joint 124.

Figure 3:
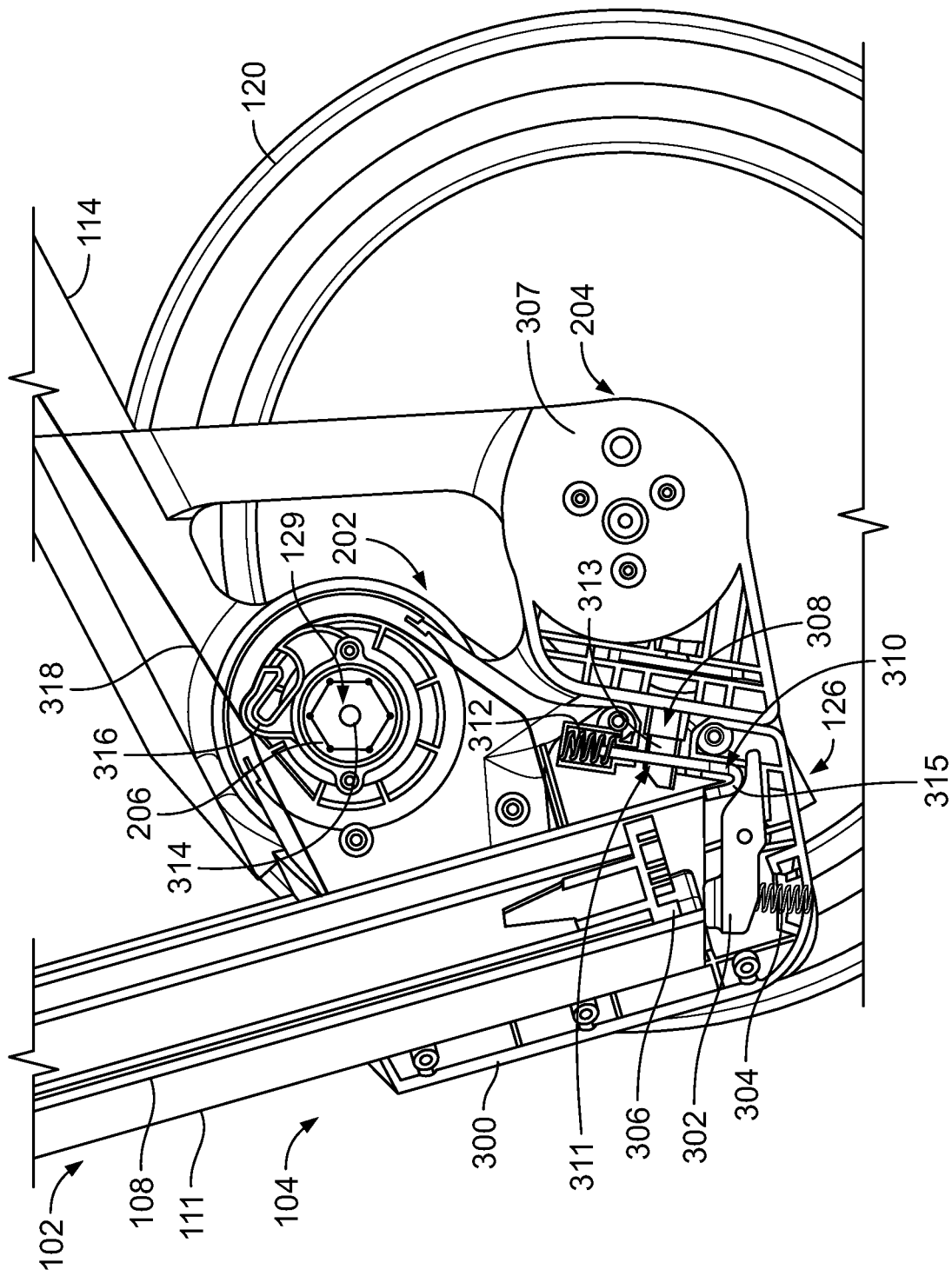
FIG. 3 is a cross-sectional view of an example handle hub for coupling a handle arm and a rear leg of the example stroller frame of FIG. 1 in accordance with the teaching of this disclosure, taken along the A-A line of FIG. 1 and rotated with the handle arm on the left.

FIG. 3 is a partial side view of the first side 104 of the example stroller 100 of FIG. 1 including a cross-sectional view of the example arm 108 and the example handle hub 126 taken along the A-A line of FIG. 1 and rotated so that the arm 108 is shown on the left. As shown in FIG. 3, at least a portion of the arm 108 is disposed in a housing 300 of the release portion 202 of the example handle hub 126. As disclosed herein, the example housing 300 of the release portion 202 of the example handle hub 126 includes means for releasing the release portion 202 from the locking portion 204. For example, the release portion 202 of FIG. 3 includes a lever 302 and a first spring 304 that engages the lever 302 (i.e., the lever 302 is spring-loaded). A foot 306 of the arm 108 is disposed proximate to the lever 302.

The example handle hub 126 includes means for coupling the release portion 202 and the locking portion 204. For example, the locking portion 204 of the example handle hub 126 of FIG. 3 includes a housing 307 having a catch pin 308 disposed therein. In the example of FIG. 3, a portion of the catch pin 308 extends from the locking portion 204 into the housing 300 of the release portion 202 to couple the release portion 202 to the locking portion 204. The housing 300 of the release portion 202 includes a catch plate 310 having an opening 311 to receive a portion 313 of the catch pin 308 to couple the release portion 202 to the locking portion 204. In some examples, the portion 313 of the catch pin 308 includes a notch that engages (e.g., receives) a portion of the catch plate 310 via the opening 311. In the example of FIG. 3, the catch plate 310 is spring-loaded via a second spring 312 disposed in the housing 300 of the release portion 202. As illustrated in FIG. 3, an end 315 of the catch plate 310 engages the lever 302.

As also illustrated in FIG. 3, an end 314 of the tube 129 is coupled to the pivot plate 206 of the release portion 202. The example pivot plate 206 includes means for routing a cable disposed in the release portion 202. For example, the pivot plate 206 of FIG. 3 includes a router 316 (e.g., a shaft or other mechanical structure having a perimeter about which the cable 318 can be wound). A cable 318 is at least partially wound about the router 316. The cable 318 extends from the router 316 to the joint 124 of the stroller frame 102 via the rear leg 114. In some examples, the router 316 rotates with the rotating tube 129 via the pivot plate 206 to tighten or loosen tension of the cable 318.

FIGS. 3-6 illustrate folding of the arm 108 (and, thus, the handle 110 of the example stroller 100 of FIG. 1) via the example handle hub 126 as part of folding of the stroller frame 102. To fold the stroller frame 102, the user exerts a downward force on the handle 110 (e.g., pushes down on the handle 110 in direction toward the surface on which the stroller frame 102 rests). As a result, the arm 108 moves (e.g., slides) downward, as represented by the arrow 400 of FIG. 4. In some examples, before pushing down on the handle 110, the user releases the handle lock 109 (FIG. 1) to allow the arm 208 to slide relative to the housing 111 of the stroller frame 102. Thus, a height of the arm 108 (and, thus, the handle 110) relative to the user is decreased as compared to when the stroller 100 is in use (e.g., as shown in FIG. 1).

Figure 4:
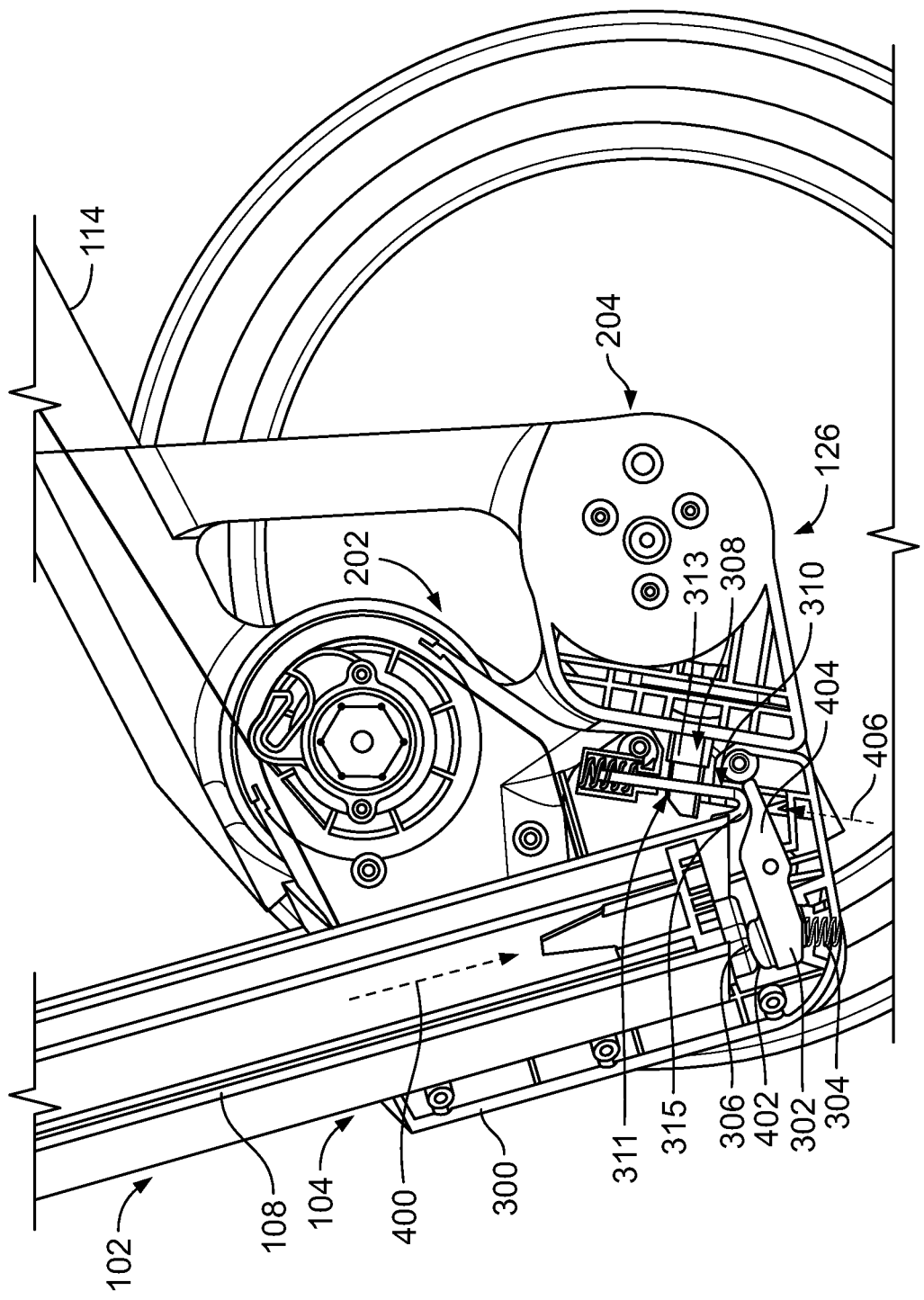
FIGS. 4-6 are cross-sectional views of the example handle hub of FIG. 3, showing the handle arm in different positions.

The sliding of the arm 208 as the user pushes on the handle 110 causes the foot 306 of the arm 108 to move from the position of FIG. 3 downward to engage a first end 402 of the lever 302, as shown in FIG. 4. In the example of FIG. 4, the force of the foot 306 on the first end 402 of the lever 302 causes the first spring 304 to compress. As a result of compression of the first spring 304, a second end 404 of the lever 302 opposite the first end 402 of the lever 302 that is engaged by the foot 306 pivots upward, or in a direction away from the surface on which the stroller frame 102 rests, as represented by the arrow 406 of FIG. 4.

When the second end 404 of the lever 302 pivots upward, the second end 404 of the lever 302 engages or exerts a force on the end 315 of the catch plate 310. The second end 404 of the lever 302 causes the catch plate 310 to move upward, or in the direction of the arrow 406 of FIG. 4. As result, the opening 311 of the catch plate 310 slides relative to the catch pin 308. In particular, the opening 311 of the catch plate 310 slides (e.g., moves upward) such that the portion 313 of the catch pin 308 no longer engages the catch plate 310. Put another away, the release portion 202 is unlocked from the locking portion 204 when the catch plate 310 slides as a result of the engagement of the foot 306 of the arm 108 with the lever 302.

Figure 5:
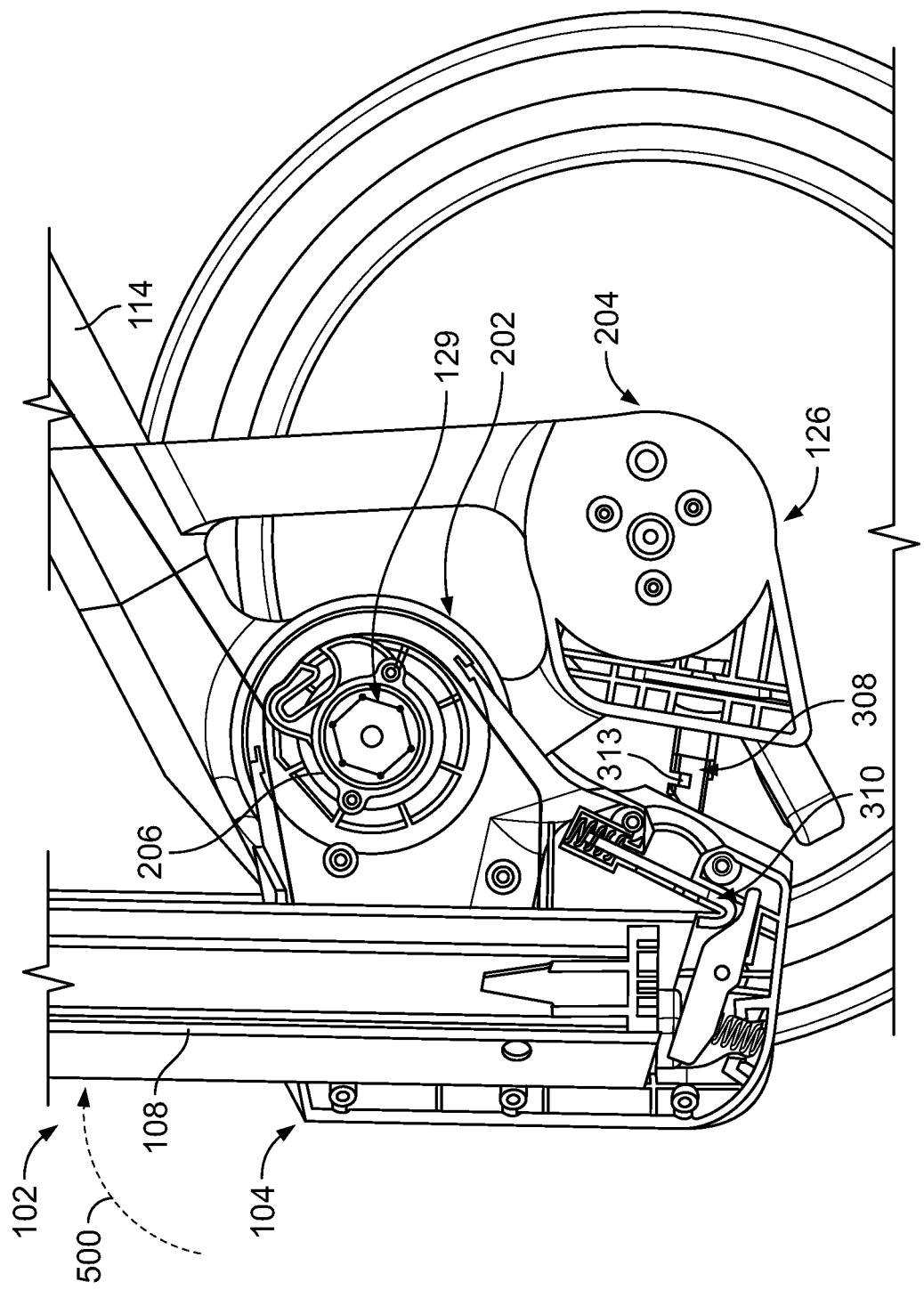

Referring to FIG. 5, the unlocking of catch pin 308 from the catch plate 310 enables the user to rotate the arm 108 toward the rear leg 114, as represented by the arrow 500 of FIG. 5. As shown in FIG. 5, when the catch pin 308 is released from the catch plate 310, the user can rotate the arm 108 about the pivot plate 206 and the tube 129. As the arm 108 rotates, the catch plate 310 moves away from the catch pin 308. Because the portion 313 of the catch pin 308 is no longer engaged with the catch plate 310 (e.g., as a result of the sliding of the opening 311 of the catch plate 310), the release portion 202 of the example handle hub 126 uncouples from the locking portion 204, as illustrated in FIG. 5.

Figure 6:
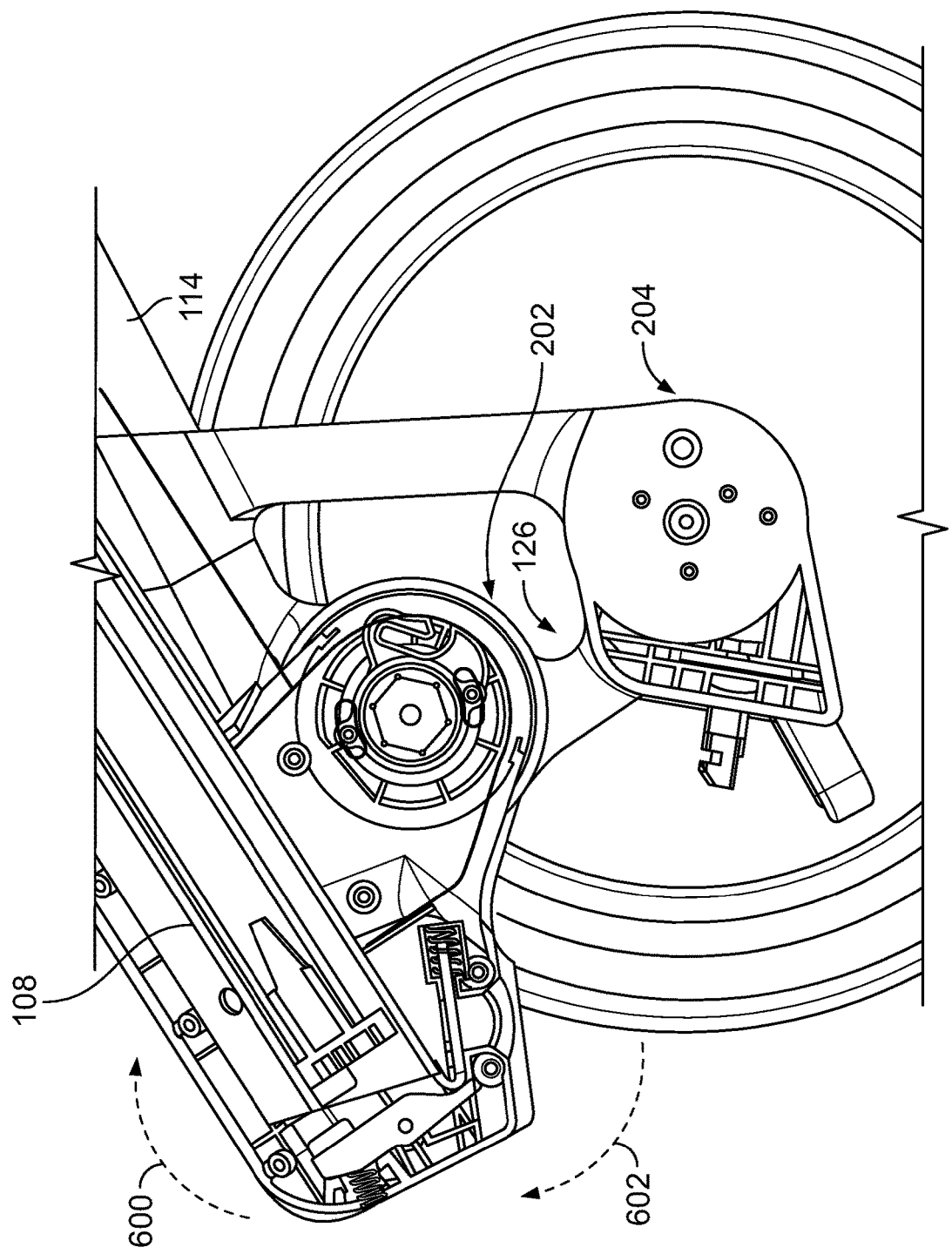

Referring to FIG. 6, as the user rotates the arm 108 about the pivot plate 206 and the tube 129, the arm 108 moves proximate to the rear leg 114, as represented by the arrow 600 of FIG. 6. The pivot plate 206 transfers rotational motion from the arm 108 to the tube 129, which causes the tube 129 to rotate and to serve as a pivot for the arm 108. As the user rotates the arm 108, the release portion 202 of the example handle hub 126 moves further away from the locking portion 204, as represented by the arrow 602 of FIG. 6. Thus, the handle of the example stroller frame 102 is substantially folded via the example handle hub 126.

Thus, the example handle hub 126 of FIGS. 1-6 provides for folding the handle 110 of the example stroller frame 102. The handle hub 126 enables the arm(s) 108 of the stroller frame 102 rotate toward the rear leg(s) 114 and, thus, cause the handle 110 to fold relative to a position of the handle 110 when the stroller 100 is in use. In some examples, the mount bar 128 of the stroller 100 includes means for securing the arm(s) 108 to secure the arm(s) 108 in the folded position and maintain the compact storage size of the folded frame 102.

Figure 7:
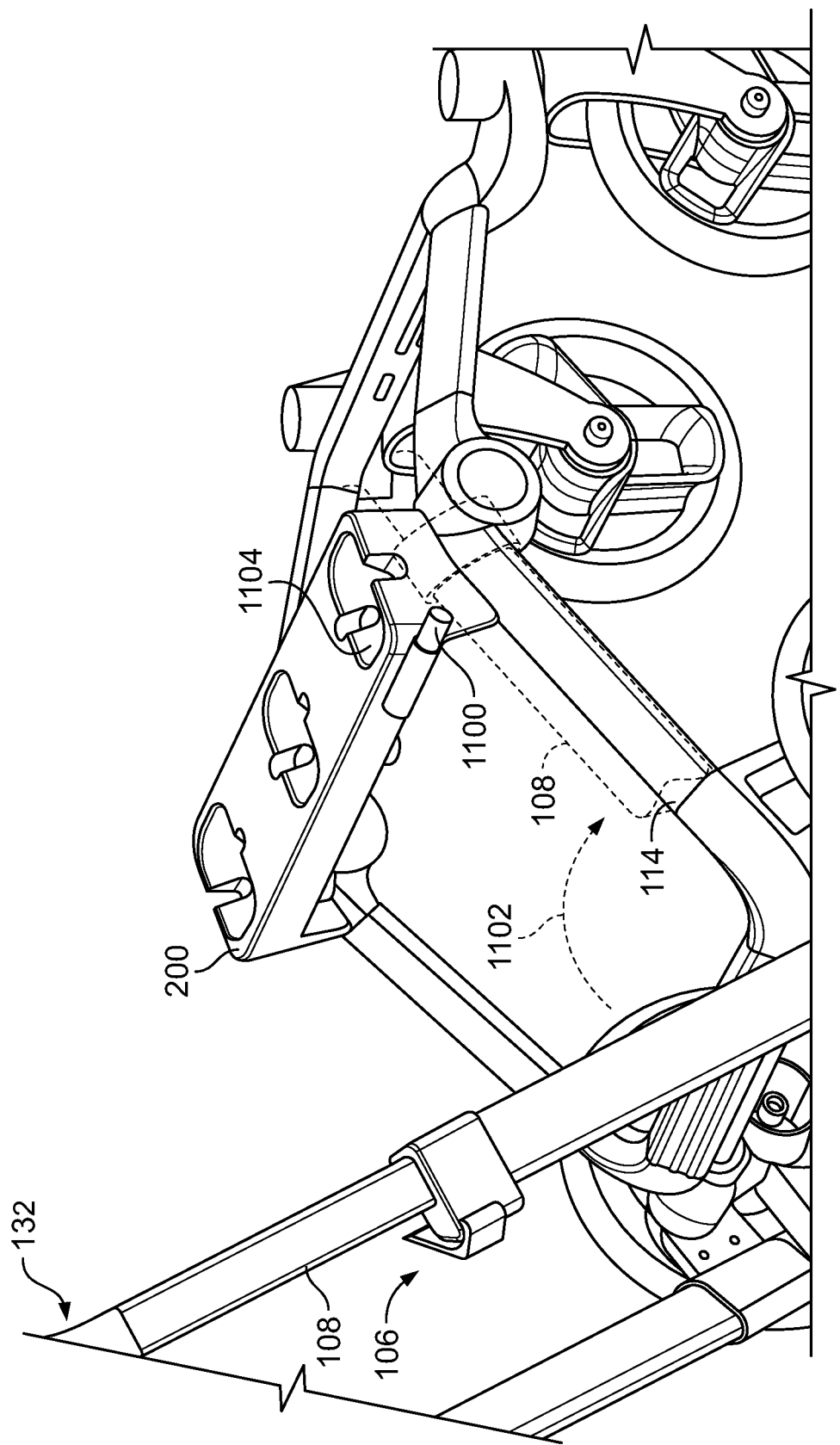
FIG. 7 is a left, rear perspective view of the example stroller of FIG. 1 including a storage pin in accordance with the teachings of this disclosure.

FIG. 7 is a left, rear perspective view of the example stroller 100 of FIG. 1 including the mount bar 128 and the arm(s) 108. The example mount bar 128 of FIG. 7 includes a storage pin 1100 or other means for securing the arm(s) 108. Although the example storage pin 1100 is shown in FIG. 7 on the second side 106 of the example stroller 100, in some examples, a storage pin 1100 is additionally or alternatively disposed on the mount bar 128 at the first side 104 (e.g., to secure the arm 108 of the first side 104 in the folded position).

As represented by the arrow 1102 of FIG. 7, the arm 108 moves toward the rear leg 114 of the example stroller frame 102 when the release portion 202 is uncoupled from the locking portion 204 of the example handle hub 126. In some examples, the arm 108 is substantially parallel to the rear leg 114 when the arm 108 is pivoted about the pivot plate 206 and the tube 129 of the handle hub 126.

The example storage pin 1100 is a spring-loaded pin that extends from an opening 1104 defined in the mount bar 128. In some examples, when the user folds the arm 108, the user moves the arm 108 such that the storage pin 1100 retracts as the arm 108 pass the storage pin 1100 (e.g., the arm 108 pushes the storage pin 1100 inward relative to the opening 1104). In such examples, the storage pin 1100 automatically extends after the arm 108 has passed the storage pin 1110 such that the arm 108 is located (e.g., sits) below the storage pin 1100 when the arm 108 is in the folded position, as represented by the dashed outline of the arm 108 in FIG. 7. Thus, the storage pin 1100 secures (e.g., holds) the arm 108 in the folded position. As disclosed herein, when the user wishes to unfold the example stroller, the user presses the storage pin 1100 inward relative to the opening 1104 to release the arm 108 from being held by the storage pin 1100.

As disclosed above, the example handle hub 126 includes the pivot plate 206 having a router 316 about which a cable 318 is wound. In the examples of FIGS. 1-7, the cable 318 extends from the pivot plate 206 through a housing of the rear leg 114 to the joint 124 of the example stroller frame 102 coupling the respective rear leg 114 to the front leg 112. In particular, the cable 318 is coupled to a pin disposed in the joint 124. In examples disclosed herein, the folding of the arm 108 forming the handle 110 causes the cable 318 to pull on the pin of the joint 124 and release the locking of the joint 124 to enable the front leg 112 to fold relative to the rear leg 114.

Figure 8:
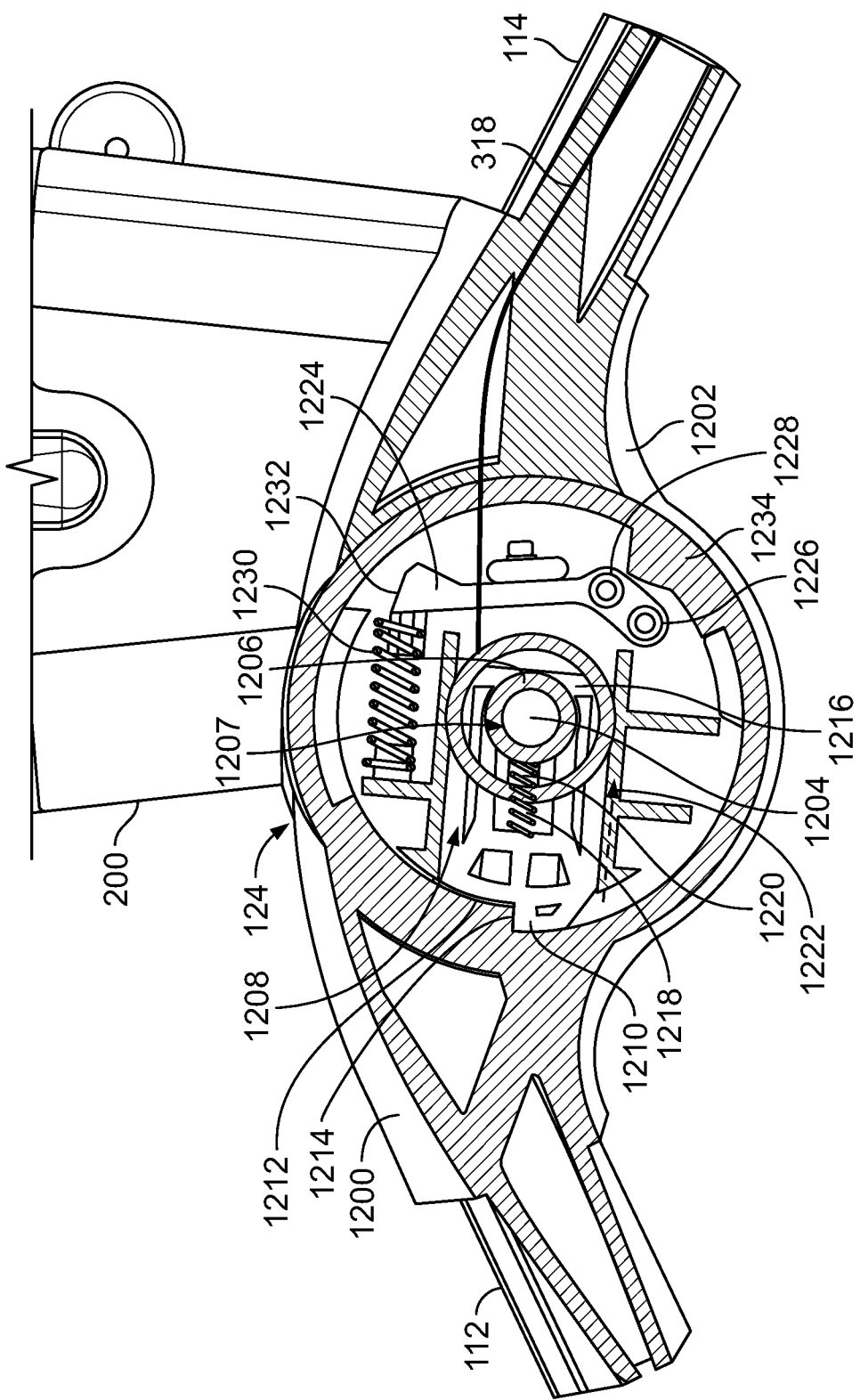
FIG. 8 is a cross-sectional view of an example joint for coupling the rear leg to a front leg of the example stroller of FIG. 1 in accordance with the teachings of this disclosure, taken along the C-C line of FIG. 1.

FIG. 8 is a cross-sectional view of the joint 124 of the example stroller 100 of FIG. 1 taken along the C-C line of FIG. 1. As disclosed above, the example joint 124 couples the rear leg 114 and the front leg 112 of the example stroller frame 102 of FIGS. 1-7. For illustrative purposes, the handle arm 108 is not shown in FIG. 8. However, as disclosed above, the arm 108 is disposed proximate to the rear leg 114 during folding of the front leg 112 (e.g., FIGS. 6, 7).

The example joint 124 of FIG. 8 includes a first housing 1200 coupled to the front leg 112 and a second housing 1202 coupled to the rear leg 114. The first housing 1200 and the second housing 1202 are rotatably coupled to one another such that the first housing 1200 can rotate relative to the second housing 1202 and, thus, the front leg 112 can rotate relative to the rear leg 114. For example, a diameter of the first housing 1200 may be less than a diameter of the second housing 1202 such that the first housing 1200 is received in the second housing 1202 and rotate relative to the second housing 1202 or vice versa. In some examples, the second housing 1202 includes an axle 1204 disposed therein and the first housing 1200 includes a receiver 1206 having an opening 1207 to receive the axle 1204 to rotatably couple the first and second housings 1200, 1202.

The first example housing 1200 includes means for locking the front leg 112 in an extended position when the stroller 100 is in use. For example, the first housing 1200 includes a lock pin 1208 disposed therein. When the example stroller 100 is in the expanded or use position, the lock pin 1208 prevents front leg 112 from folding (e.g., the lock pin 1208 holds the front leg 112 in the extended position shown in FIG. 1). When the example stroller 100 is in the expanded or use position, a protrusion 1210 formed at a first end 1212 of the lock pin 1208 engages a pin stop 1214 defined by the first housing 1200 of joint 124. The engagement between the protrusion 1210 and the pin stop 1214 prevents the front leg 112 from rotating relative to the rear leg 114 via the housings 1200, 1202.

As disclosed above, a cable 318 extends from the pivot plate 206 of the handle hub 126 through the rear leg 114. In the example of FIG. 8, an end of the cable 318 is coupled to a second end 1216 of the lock pin 1208 (e.g., coupled to an opening formed in the second end 1216 of the lock pin 1208). Thus, the cable 318 extends between the router 316 of the handle hub 126 and the lock pin 1208 of the joint 124 via the rear leg 114.

The example lock pin 1208 of FIG. 8 includes means for driving the locking pin. For example, the lock pin 1208 is spring-loaded via a first spring 1218. In the example of FIG. 8, the first spring 1218 is disposed about a shaft 1220 formed in the lock pin 1208. In the example of FIG. 8, the first spring 1218 is in an extended position when the protrusion 1210 engages the pin stop 1214.

As disclosed herein, when the handle arm 108 folds via the example handle hub 126 of FIGS. 1-6, the handle hub 126 pulls on the cable 318 (e.g., via the router 316 of pivot plate 206 about which the cable 318 is wound during rotation of the arm 108 about the pivot plate 206 and rotation of the tube 129 coupled to the pivot plate 206). In the example of FIG. 8, folding of the arm 108 causes the cable 318 to pull the protrusion 1210 of the lock pin 1208 away from the pin stop 1214 against the force of the spring 1218 (e.g., due to increased tension on the cable 318 during folding of the arm 108 at the handle hub 126), as represented by the arrow 1222 of FIG. 8. When the protrusion 1210 clears the pin stop 1214, the first housing 1200 is rotatable relative to the second housing 1202.

The example joint 124 of FIG. 8 includes means for securing the first front leg 112 in a folded position. For example, the joint 124 includes a detent arm 1224 disposed in the first housing 1200. The detent arm 1224 is pivotably coupled to the first housing 1200 via one or more fasteners 1226 disposed at a first end 1228 of the detent arm 1224. The example joint 124 includes means for driving the detent arm 1224. For example, the detent arm 1224 is spring-loaded via a second spring 1230 disposed in the first housing 1200. The second spring 1230 engages a second end 1232 of the detent arm 1224. When the stroller 100 is in the expanded or use position, the second spring 1230 is in an extended position and the detent arm 1224 is in a resting position. The first housing 1200 defines a ledge portion 1234 disposed proximate to the detent arm 1224. As disclosed herein, during rotation of the first housing 1200, the ledge portion 1234 engages or interferes with at least a portion of the detent arm 1224. The engagement between the detent arm 1224 and the ledge portion 1234 of the first housing 1200 facilitates the securing of the front leg 112 in the folded position via the detent arm 1224, as disclosed in more detail below.

Figure 9:
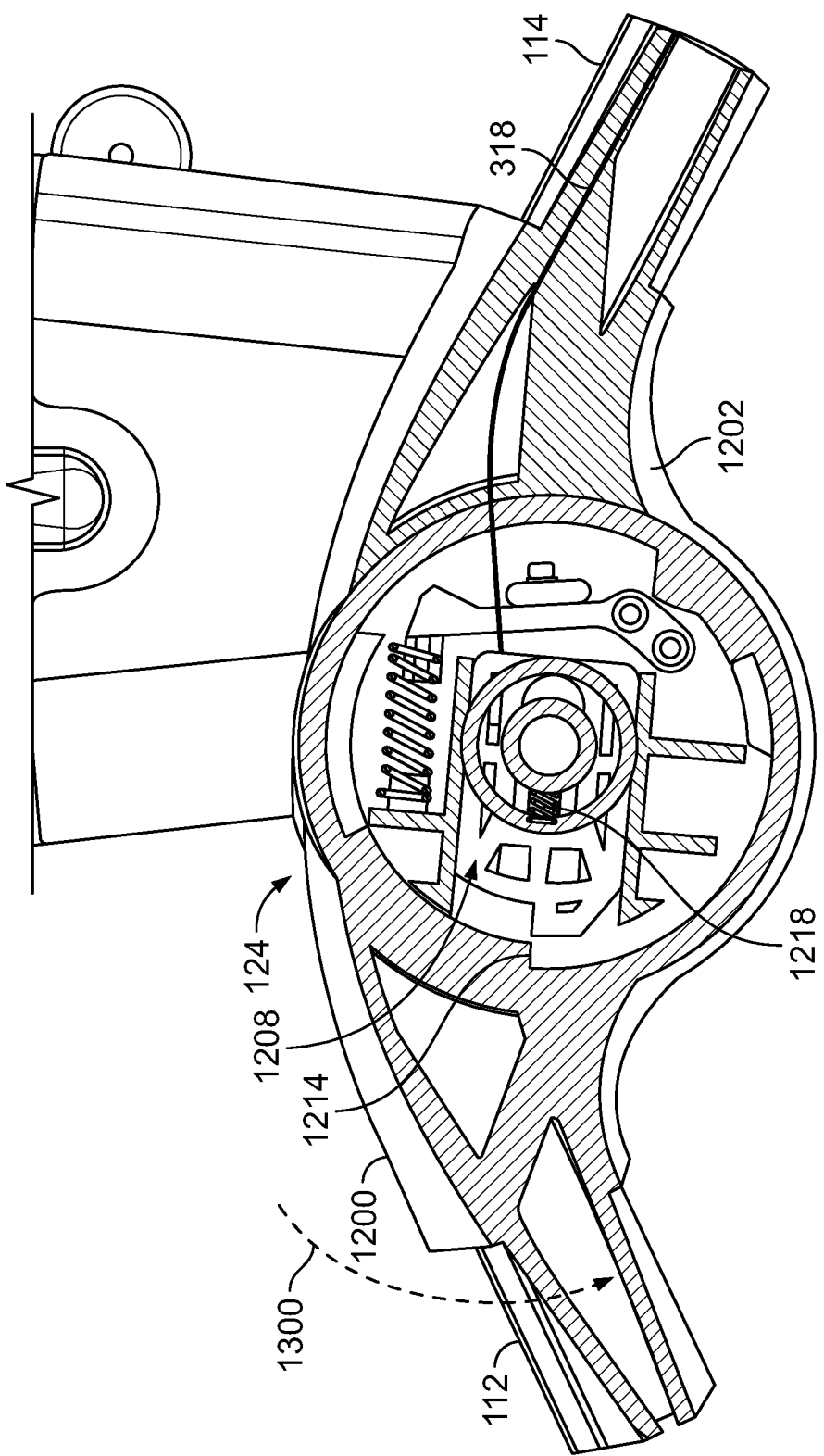
FIGS. 9-12 are cross-sectional views of the example joint of FIG. 12, showing the front leg in different positions.

FIG. 9 illustrates the removal of the protrusion 1210 of the lock pin 1208 from the pin stop 1214 of the example joint 124 of FIG. 8. As shown in FIG. 9, the first spring 1218 is compressed relative to the position of the first spring 1218 when the protrusion 1210 engages the pin stop 1214 shown in FIG. 9 due to the pulling by the cable 318 on the lock pin 1208 during folding of the arm 108 about the handle hub 126.

When the protrusion 1210 of the example lock pin 1208 is displaced relative to the pin stop 1214, the first housing 1200 is free to rotate relative to the second housing 1202 and, thus, the front leg 112 is free to rotate or fold relative to the rear leg 114, as represented by the arrow 1300 of FIG. 9. For example, the user can pivot (e.g., tip) the stroller frame 102 onto the rear wheel(s) 120 as if to lift the front wheel(s) 116 of the stroller 100. As a result, the folded handle arm 108 and the rear leg 114 move to a substantially vertical position relative to the surface on which the stroller frame 102 rests. Because the lock pin 1208 is released relative to the pin stop 1214, the front leg 112 folds or collapses relative to the rear leg 114 when the stroller frame 102 is pivoted on the rear wheel(s) 120 (rather than remaining extended as the front leg 112 would if the stroller 100 were lifted on the rear wheel 120 when the lock pin 1208 is engaged with the pin stop 1214). In some examples, the user guides or pushes the front leg 112 in the direction of the arrow 1300 of FIG. 9 during folding of the stroller frame 102.

Figure 10:
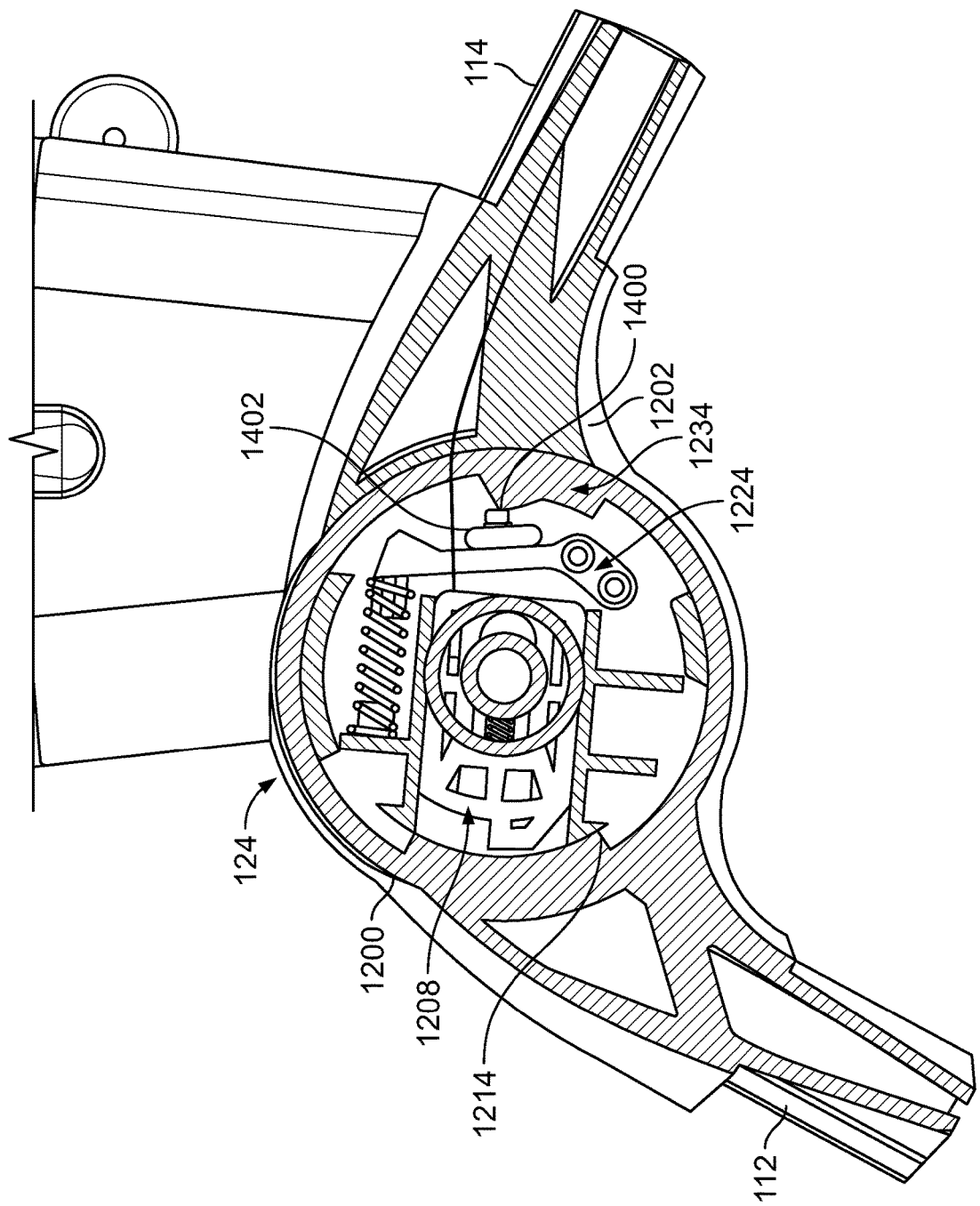

FIG. 10 illustrates the folding of the front leg 112 via rotation of the first housing 1200 relative to the second housing 1202 of the example joint 124 of FIGS. 8 and 9. As illustrated in FIG. 10, the portion of the first housing 1200 including the pin stop 1214 rotates past the lock pin 1208.

As also illustrated in FIG. 10, the ledge portion 1234 of the first housing 1200 rotates relative to the detent arm 1224 during rotation of the first housing 1200. The example ledge portion 1234 of the first housing 1200 includes a protrusion 1400. In some examples, the protrusion 1400 of the ledge portion 1234 engages a clicker 1402 coupled to the detent arm 1224. The clicker 1402 provides audible feedback (e.g., a clicking noise) to the user as the user guides the front leg 112 to the folded position to inform the user that, for example, the front leg 112 can be folded further toward the rear leg 114.

Figure 11:
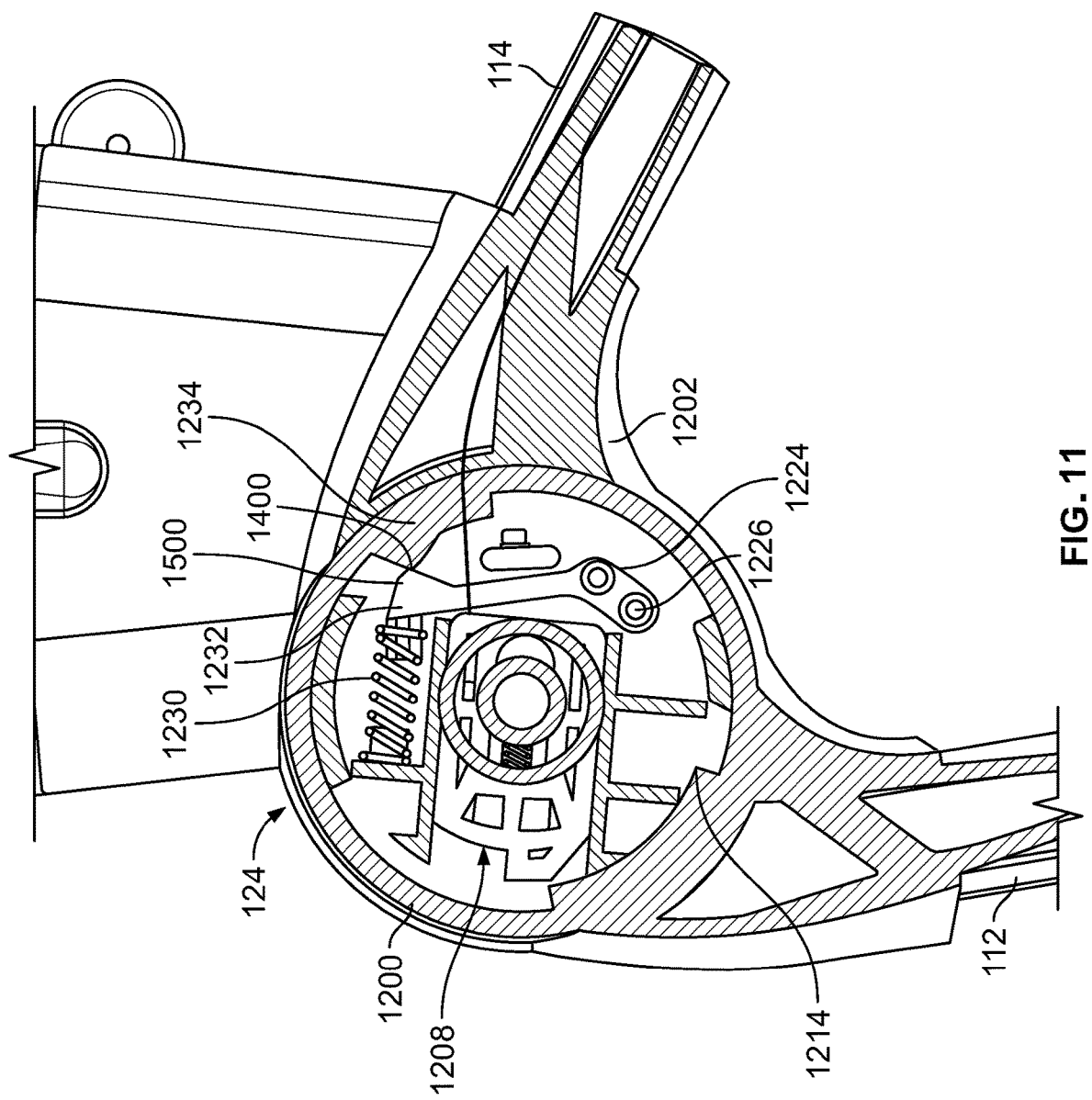

FIG. 11 illustrates the engagement of the ledge portion 1234 of the first housing 1200 with the second end 1232 of the detent arm 1224 during folding of the front leg 112 via the example joint 124. As illustrated in FIG. 15, the protrusion 1400 of the ledge portion 1234 engages a protrusion 1500 formed in the second end 1232 of the detent arm 1224. When the protrusion 1400 of the ledge portion 1234 engages the protrusion 1500 of the detent arm 1224, the protrusion 1400 pushes on the second end 1232 of the detent arm 1224, which causes the second spring 1230 associated with the detent arm 1224 to move to a compressed position (e.g., the second end 1232 of the detent arm 1224 pivots or deflects about the fastener 1226 at the first end 1228 of the detent arm 1224 as the protrusion 1400 pushes on the second end 1232). Thus, the detent arm 1224 moves to a deflected or non-rest position during folding of the front leg 112.

Figure 12:
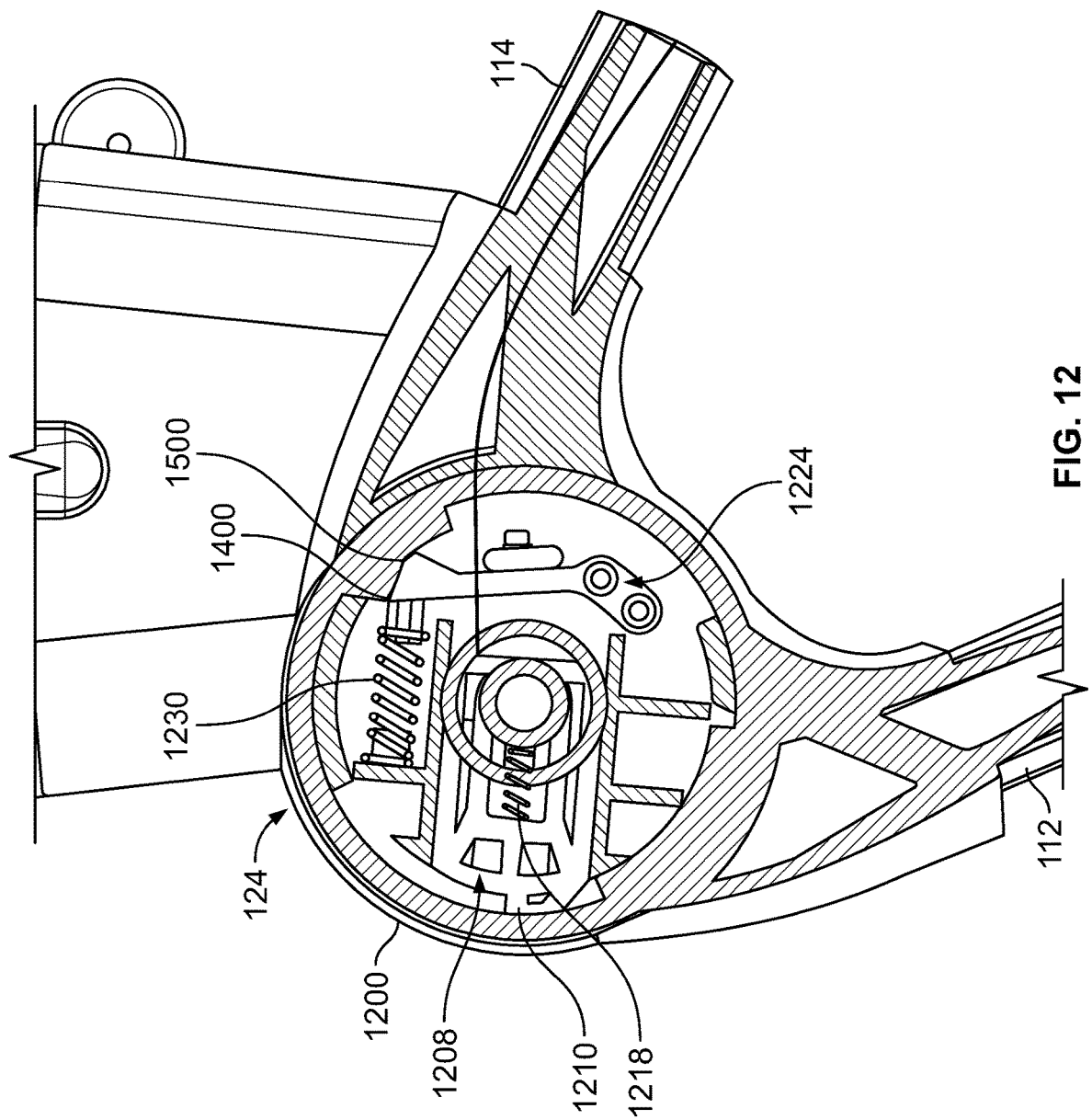

FIG. 12 illustrates the front leg 112 in a folded position via the example joint 124 of FIGS. 8-11. In the example of FIG. 12, the first housing 1200 is rotated relative to the second housing 1202 such that the protrusion 1400 of the ledge portion 1234 of the first housing 1200 has moved past the protrusion 1500 of the detent arm 1224. Put another way, the front leg 112 has moved substantially past an apex of the detent arm 1224. As a result, because the protrusion 1400 of the ledge portion 1234 is no longer pressing on the protrusion 1500 of the detent arm 1224, the second spring 1230 moves from the compressed position of FIG. 11 to the extended position. In the example of FIG. 12, as the detent arm 1224 returns to a rest position due to the extension of the second spring 1230, the detent arm 1224 generates an audible noise (e.g., a snapping sound) that indicates to the user that the front leg 112 is folded. In the example of FIG. 12, the detent arm 1224 holds the front leg 112 in the folded position when the ledge portion 1234 is in the position of FIG. 12.

When the first housing 1200 of the example joint 124 is rotated as shown in FIG. 12, the first spring 1218 of the lock pin 1208 returns to the extended position and the protrusion 1210 of the lock pin 1208 engages (e.g., re-engages) a surface of the first housing 1200. In some examples, the lock pin 1208 further assists to hold the front leg 112 in the folded position when the first housing 1200 is rotated as shown in FIG. 12. Thus, the example front leg 112 is folded relative to the rear leg 114 via the example joint 124 of FIGS. 8-12.

Figure 13:
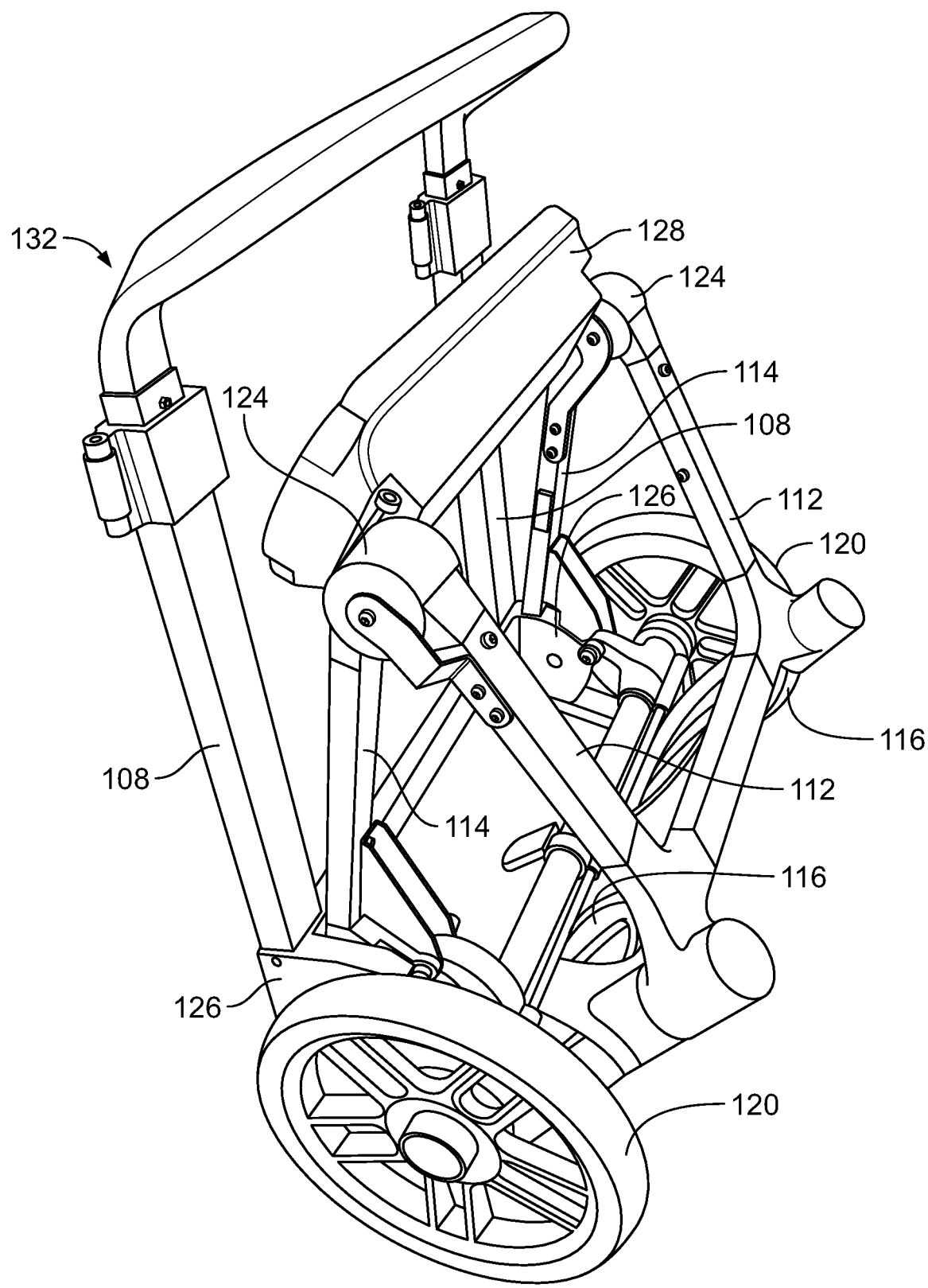
FIG. 13 is a left, front perspective view of the example stroller frame of FIG. 1 in a folded position.

FIG. 13 is a left, front perspective view of the example stroller 100 of FIG. 1 showing the stroller frame 102 in a folded position, or a position in which the handle arm(s) 108 are folded relative to the rear leg(s) 114 and the front leg(s) 112 are folded relative to the rear leg(s) 114. As illustrated in FIG. 13, when the front leg(s) 112 are in the folded position, the front wheel(s) 116 swivel relative to the seat mount 128 to further reduce a size of the folded stroller frame 102 (or, in some examples, are guided inward by the user during folding of the front leg(s) 112). For example, the front wheel(s) 116 swivel such that the wheel(s) 116 are substantially perpendicular to the rear wheel(s) 120. In some examples, the front wheel(s) 116 are held in the inwardly swiveled position by the detent arm 1224 of the example joint 124 (e.g., when the ledge portion 1234 is the position of FIG. 12).

As also illustrated in FIG. 13, when the example stroller frame 102 is in the folded position, the stroller frame 102 substantially rests on the rear wheels 120 and the example handle hubs 126. In some examples, the handle hub 126 includes feet or projections to facilitate stability of the example stroller frame 102 when in the folded position. The example stroller frame 102 provides for compact storage of the example stroller 100 when the stroller is not in use due to the folding of the frame 102 at the handle hub 126 and the joints 124. As disclosed above in connection with FIG. 7, in some examples, the arms 108 are held by the storage pin 1100 of the mount bar 128 such that a distance between a respective arm 108 and a respective rear leg 114 in the folded position is minimized when the arm 108 is in the folded position to further reduce a size of the folded stroller frame 102.

In some examples, the user wishes to move the stroller frame 102 from the folded position shown in FIG. 13 to the expanded or use position of FIGS. 1 and 2. To unfold the example stroller frame 102 the user pulls the front leg(s) 112 away from the rear leg(s) 114. Referring to one of the sides 104, 106 of the example stroller frame 102 as the front leg 112 moves from the collapsed position to the extended position, the first housing 1200 of the example joint 124 rotates in the opposite direction of rotation during folding of the front leg 112 (e.g., opposite the rotation of the first housing 1200 illustrated in FIGS. 8-12). As the first housing 1200 rotates during extension of the front leg 112, the ledge portion 1234 of the first housing 1200 moves past the detent arm 1224 of the example joint 124 (e.g., in the opposite direction shown in FIGS. 8-12). Also, as the first housing 1200 rotates during extension of the front leg 112, the portion of the first housing 1200 including the pin stop 1214 rotates so as to return the position in which the lock pin 1208 engages the pin stop 1214 (e.g., FIG. 8). The user pivots or swivels the front wheels outward, or in a direction of travel of the stroller 100.

In some examples, the user unlocks the handle arms 108 from the folded position by releasing the storage pin 1100 of FIG. 7 to allow the arm 108 to rotate away from the rear leg 114 (e.g., by pressing the storage pin 1100 inward relative to the opening 1104 of the mount bar 128). The user rotates the arm 108 away from the rear leg 114 until the release portion 202 engages the locking portion 204 of the handle hub 126, thereby locking the stroller frame 102 in the extended position. The user can couple one or more seats and/or accessories to the example stroller frame 102 via the mount bar 128.

Figure 14:
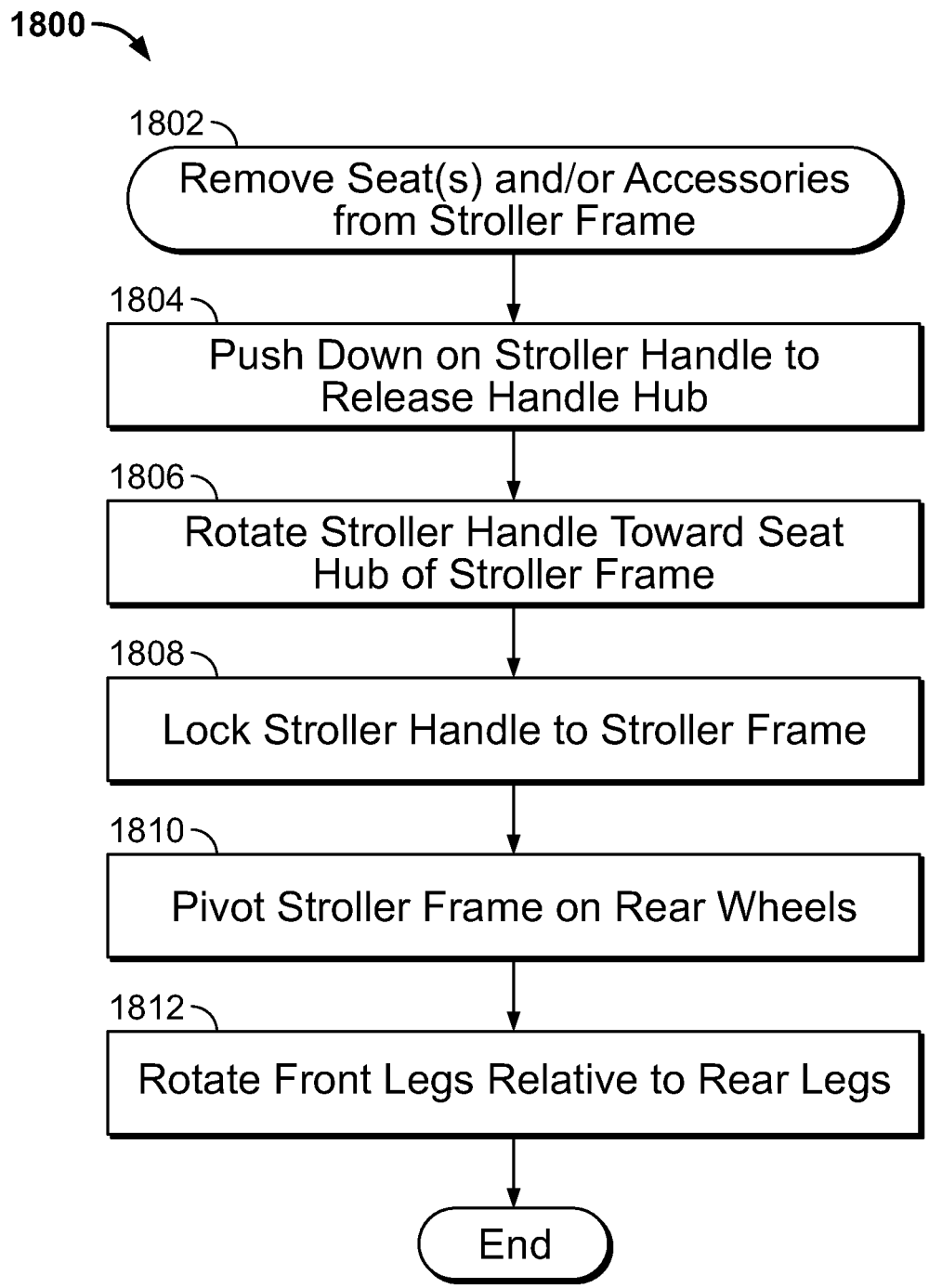
FIG. 14 is a flowchart representative of an example method disclosed herein for folding a stroller frame.

FIG. 14 is a flowchart illustrating an example process 1800 for folding a frame (e.g., the stroller frame 102) of a stroller (e.g., the stroller 100). Although the example process 1800 is disclosed with respect to the flowchart illustrated in FIG. 14, many other methods of operating the example stroller frame 102 may alternatively be used. For example, the order of execution of the blocks may be changed, and/or some of the blocks described may be changed, eliminated, or combined.

In the example of FIG. 14, one or more seats and/or accessories are removed from the stroller frame prior to folding the stroller frame (block 1802). For example, a user can uncouple the seat(s) (e.g., the seat 200) and/or accessories from the mount bar 128 of the stroller frame 102 of FIG. 8.

The example process 1800 of FIG. 14 includes pushing down on a handle of the stroller frame to release a handle hub (block 1804). For example, the user can push down on the parent handle 110 of the stroller frame 102. On each side of the stroller frame 102, the parent handle 110 includes the arm 108 and a handle hub 126 that couples the arm 108 to the rear leg 114. In examples where the stroller frame 102 includes the example handle hub 126 of FIGS. 1-6, the foot 306 of the arm 108 engages the spring-loaded lever 302 of the release portion 202 of the handle hub 126 to release the coupling between the release portion 202 and the locking portion 204 of the handle hub 126. In some examples, the user release the handle lock 109 of FIG. 1 to enable the user to push on the handle 110 and the arm 108 to slide.

The example process 1800 includes rotating the stroller handle toward a seat hub (e.g., between the rear leg and the front leg) of the stroller frame (block 1806). For example, the user rotates the handle arm 108 toward the seat hub or joint 124 coupling the front leg 112 and the rear leg 114. During rotation of the arm 108, the pivot plate 206 of the handle hub 126 pulls on the cable 318 that is wound about the router 316 of the pivot plate 206 and extends to the joint 124 via the rear leg 114. The pulling of the cable 318 releases the lock pin 1208 from the pin stop 1214 of the joint 124, thereby allowing the front leg 112 to pivot relative to the rear leg 114.

The example process 1800 includes locking the stroller handle to the stroller frame (block 1808). For example, the user rotates the handle arm 108 toward the seat joint 124 such that the storage pin 1100 of the mount bar 128 holds the handle arm 108 proximate to the rear leg 114.

The example process 1800 includes pivoting the stroller frame on the rear wheels of the stroller frame (block 1810). For example, the user tips the stroller frame 102 (with the handle arm 108 in the folded position) as if to lift the front wheels 116 off of the surface (e.g., a floor or ground) on which the stroller frame 102 rests.

The example process 1800 includes rotating the front legs relative to the rear legs (block 1812). In the example of FIG. 14, because the lock pin 1208 of the joint 124 is disengaged from the pin stop 1214, the first housing 1200 rotates relative to the second housing 1202 and, thus, the front leg 112 can rotate relative to the rear leg 114. The user can guide the front leg 112 and the front wheels 116 inward or toward rear leg 114. The detent arm 1224 of the joint 124 deflects so as to hold the front leg in the folded position. Thus, the example stroller frame 102 can be collapsed or folded for storage.

From the foregoing, it will be appreciated that methods and apparatus have been disclosed to provide for folding of a frame of a stroller. Disclosed example stroller frames provide for user initiation of the stroller frame folding via a handle of the stroller. For example, a user pushes down on the handle to reduce height of the stroller frame and to enable the handle to be rotated toward the rear legs via a handle hub. By rotating the handle, a joint locking the front leg in an extended position is released, thereby allowing the front leg to collapse relative to the rear leg. Thus, disclosed example stroller frames can be efficiently moved to a compact position for storage without requiring difficult or cumbersome actions by the user to fold the frame.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A frame for use with a stroller, the frame comprising:
a first leg;
a second leg;
a first joint to couple the first leg and the second leg, the first joint including a detent arm and a housing;
a handle arm; and
a second joint to couple the handle arm and the first leg, the handle arm to rotate relative to the first leg via the second joint, the rotation of the handle arm via the second joint to enable the second leg to rotate relative to the first leg via the first joint to fold the frame, a protrusion of the housing to engage the detent arm when the second leg moves relative to the first leg.

2. The frame of claim 1, further including a lock disposed in the first joint, wherein the rotation of the handle arm is to release the lock to enable the second leg to rotate.

3. The frame of claim 1, wherein the second joint is operatively coupled to the first joint via a cable, the cable to extend from the second joint to the first joint via the first leg.

4. The frame of claim 3, further including a pin disposed in the first joint, the cable coupled to the pin, wherein the rotation of the handle arm is to cause the cable to pull the pin to enable the second leg to rotate.

5. The frame of claim 1, wherein the second joint includes a first portion and a second portion, the first portion removably coupled to the second portion.

6. The frame of claim 5, wherein the first portion is to disengage from the second portion via the handle arm to enable the handle arm to rotate relative to the first leg.

7. A frame for use with a stroller, the frame comprising:
a first leg;
a second leg;
a first joint to couple the first leg and the second leg;
a handle arm; and
a second joint to couple the handle arm and the first leg, the second joint including a first portion and a second portion, the first portion removably coupled to the second portion, wherein the first portion is to disengage from the second portion via the handle arm to enable the handle arm to rotate relative to the first leg, the first portion including a plate defining an opening and the second portion including a pin to be received in the opening, and further including a lever disposed in the first portion,
the handle arm to rotate relative to the first leg via the second joint, the rotation of the handle arm via the second joint to enable the second leg to rotate relative to the first leg via the first joint to fold the frame,
the handle arm to cause the lever to release the pin from the opening.

8. The frame of claim 7, wherein the lever is to cause the opening to slide relative to the pin when a portion of the handle arm engages the lever.

9. A frame for use with a stroller, the frame comprising:
a first frame member having a first wheel coupled thereto;
a second frame member having a second wheel coupled thereto;
a third frame member;
a first joint to couple the first frame member and the second frame member, the first joint including a lock;
a second joint to couple the second frame member and the third frame member, the second joint operatively coupled to the first joint; and
a cable extending from the second joint to the lock, the third frame member to rotate via the second joint to release the lock to enable the first frame member to move from an extended position to a collapsed position to fold the frame, the cable to displace the lock during rotation of the third frame member.

10. The frame of claim 9, further including a plate disposed in the second joint, the cable to be at least partially wound about the plate, the third frame member to pivot about the plate.

11. The frame of claim 9, wherein the lock is a first lock and the second joint includes a second lock, the third frame member to slide relative to the second joint to release the second lock to enable the third frame member to rotate.

12. A frame comprising:
a first frame member having a first wheel coupled thereto;
a second frame member having a second wheel coupled thereto;
a third frame member;
a first joint to couple the first frame member and the second frame member, the first joint including a lock, a detent arm, and a housing; and
a second joint to couple the second frame member and the third frame member, the second joint operatively coupled to the first joint, the third frame member to rotate via the second joint to release the lock to enable the first frame member to move from an extended position to a collapsed position to fold the frame, a protrusion of the housing to engage the detent arm when the first frame member moves to the collapsed position.

13. The frame of claim 12, wherein the first joint includes a stop, the lock to engage the stop when the first frame member is in the extended position.

14. A stroller comprising:
a frame including:
a front leg;
a rear leg;
a handle;
a first joint to couple the front leg and the rear leg, the first joint including a lock;
a second joint to couple the handle and the rear leg; and
a cable extending from the second joint to the lock;
a front wheel coupled to the front leg;
a rear wheel coupled to the rear leg; and
a mount bar coupled to the frame proximate to the first joint, the handle to rotate relative to the rear leg via the second joint, the cable to displace the lock during rotation of handle, the rotation of the handle to enable the front leg to rotate relative to the rear leg via the first joint, the handle to be disposed proximate to the mount bar when the frame is in a folded position.

15. The stroller of claim 14, wherein the mount bar includes a pin, the handle to engage the pin when the frame is in the folded position.

16. The stroller of claim 14, wherein when the frame is in the folded position, the rear wheel and a portion of the second joint are to engage a surface on which the frame rests.

17. The stroller of claim 16, wherein the front wheel is to pivot relative to the rear wheel when the frame is in the folded position.

18. The stroller of claim 14, wherein the handle includes an arm and the second joint includes a first portion and second portion, the first portion removably coupled to the second portion, the arm to slide relative to the second joint to release the first portion from the second portion.

19. The stroller of claim 14, further including a tube coupled to the second joint, the tube to extend between a first side of the frame and a second side of the frame, the handle to pivot about the tube.

* * * * *